(12) United States Patent
Burnam et al.

(10) Patent No.: US 11,829,962 B2
(45) Date of Patent: Nov. 28, 2023

(54) PAYMENT DELEGATION AND LINKING SYSTEM

(71) Applicant: Capital One Services, LLC, McLean, VA (US)

(72) Inventors: Eric Burnam, Midlothian, VA (US); Bhavik Gudka, Elk Grove Village, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/323,164

(22) Filed: May 18, 2021

(65) Prior Publication Data

US 2022/0374846 A1    Nov. 24, 2022

(51) Int. Cl.
| | |
|---|---|
| *G06Q 20/40* | (2012.01) |
| *G06Q 20/06* | (2012.01) |
| *G06Q 20/38* | (2012.01) |
| *H04L 9/40* | (2022.01) |

(52) U.S. Cl.
CPC ........... *G06Q 20/06* (2013.01); *G06Q 20/389* (2013.01); *G06Q 20/401* (2013.01)

(58) Field of Classification Search
CPC ..... G06Q 20/06; G06Q 20/389; G06Q 20/401
See application file for complete search history.

(56) References Cited

U.S. PATENT DOCUMENTS

| | | | | |
|---|---|---|---|---|
| 10,380,583 | B1 * | 8/2019 | Ellis | G06Q 20/322 |
| 10,579,975 | B2 * | 3/2020 | Coffman | G06Q 20/102 |
| 10,621,563 | B1 * | 4/2020 | Spindel | G06Q 20/3223 |
| 2006/0178986 | A1 | 8/2006 | Giordano et al. | |
| 2014/0180929 | A1 | 6/2014 | Ohnishi et al. | |
| 2015/0019443 | A1 * | 1/2015 | Sheets | G06Q 20/322 |
| | | | | 705/71 |
| 2015/0142661 | A1 | 5/2015 | Jain et al. | |
| 2019/0180275 | A1 * | 6/2019 | Safak | H04L 9/0637 |
| 2019/0318347 | A1 * | 10/2019 | Aguiar | G06K 9/6282 |
| 2020/0065800 | A1 * | 2/2020 | Kusnanto | G06Q 20/12 |
| 2020/0265409 | A1 | 8/2020 | Babu | |
| 2020/0265457 | A1 | 8/2020 | Miller et al. | |

OTHER PUBLICATIONS

Nov. 24, 2022—(WO) Invitation to Pay Fees/Partial Search Report and Provisional Opinion—App No. PCT/US2022/040790.

* cited by examiner

*Primary Examiner* — Bennett M Sigmond
*Assistant Examiner* — Bhavin D Shah
(74) *Attorney, Agent, or Firm* — Banner & Witcoff, Ltd.

(57) ABSTRACT

Methods, systems, devices, and computer-readable media for a payment delegation and linking system are provided. The system may generate a delegation request to send to an individual for payment of a portion of a value of a transaction. The delegation request may be sent to the individual with a payment URL embedded with a token. Upon initiation of payment in response to the delegation request, the token may be embedded in an unused field of a payment transaction record generated at the individual's device and may be transmitted from the individual's device to a payment processing system for processing and settlement. The payment transaction record may ultimately be received at the requestor's bank with the token intact. The token may be used to link the received payment transaction with the original delegated transaction. The original delegated transaction and the received payment transaction may be displayed together in a transaction summary.

21 Claims, 21 Drawing Sheets

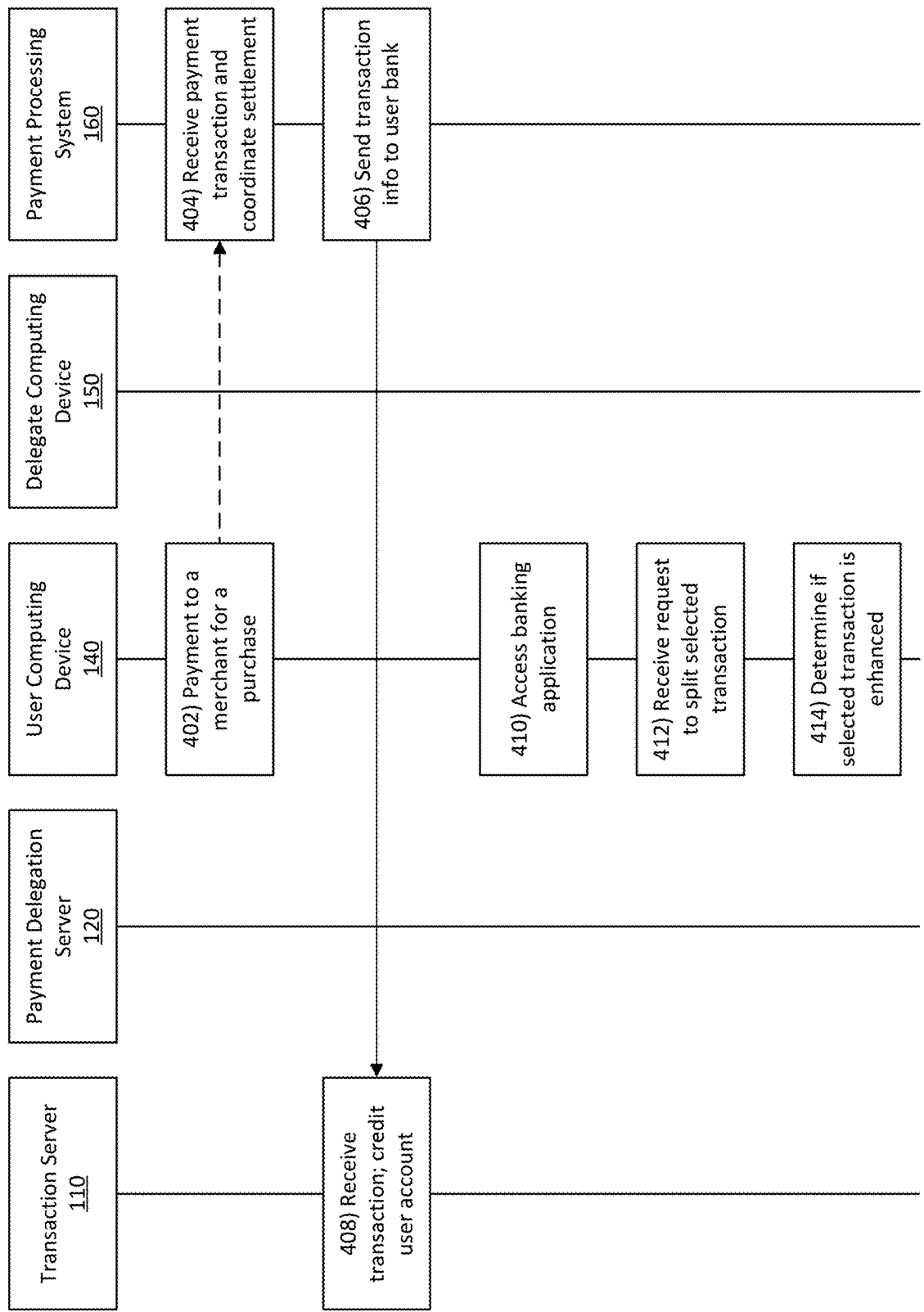

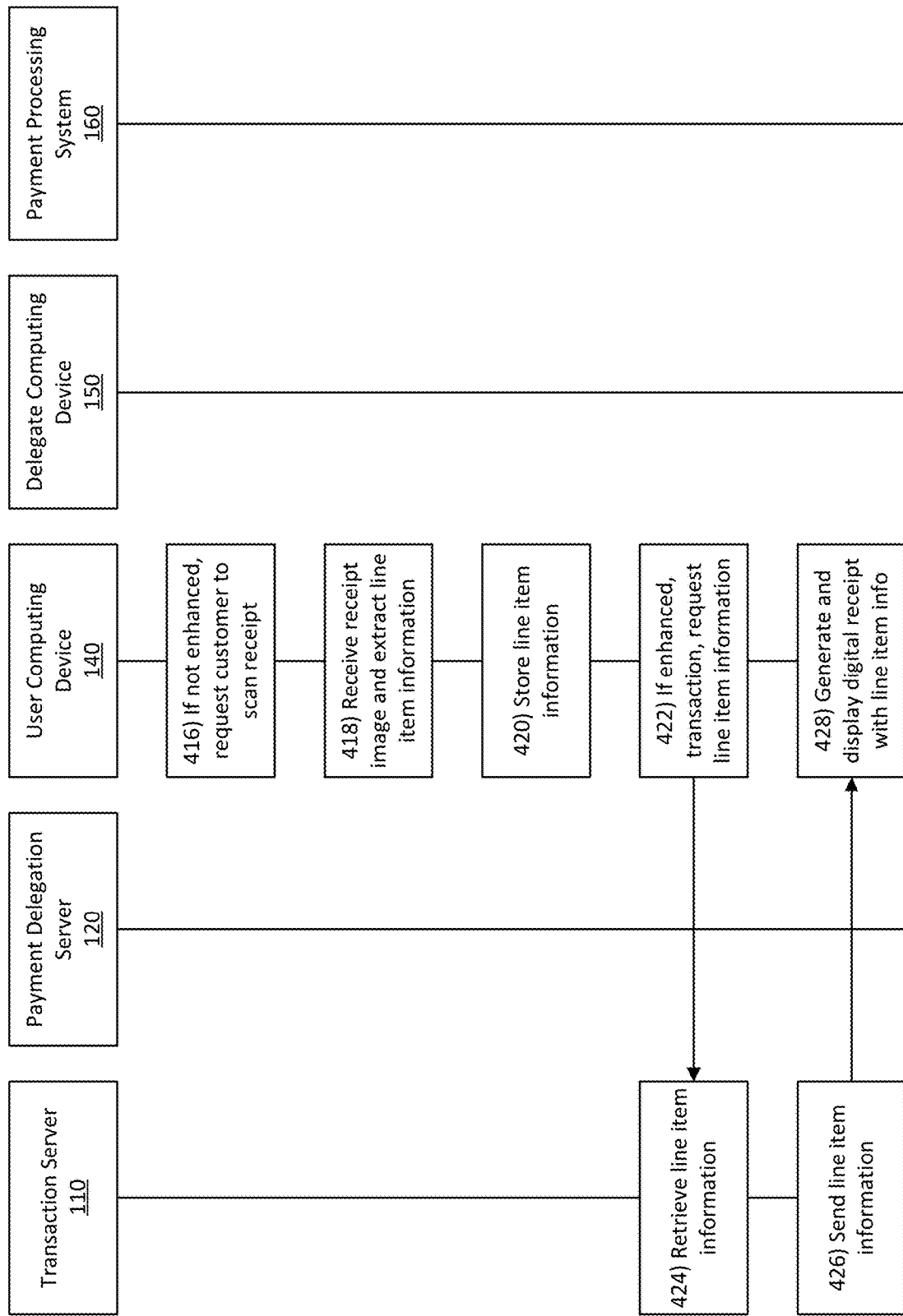

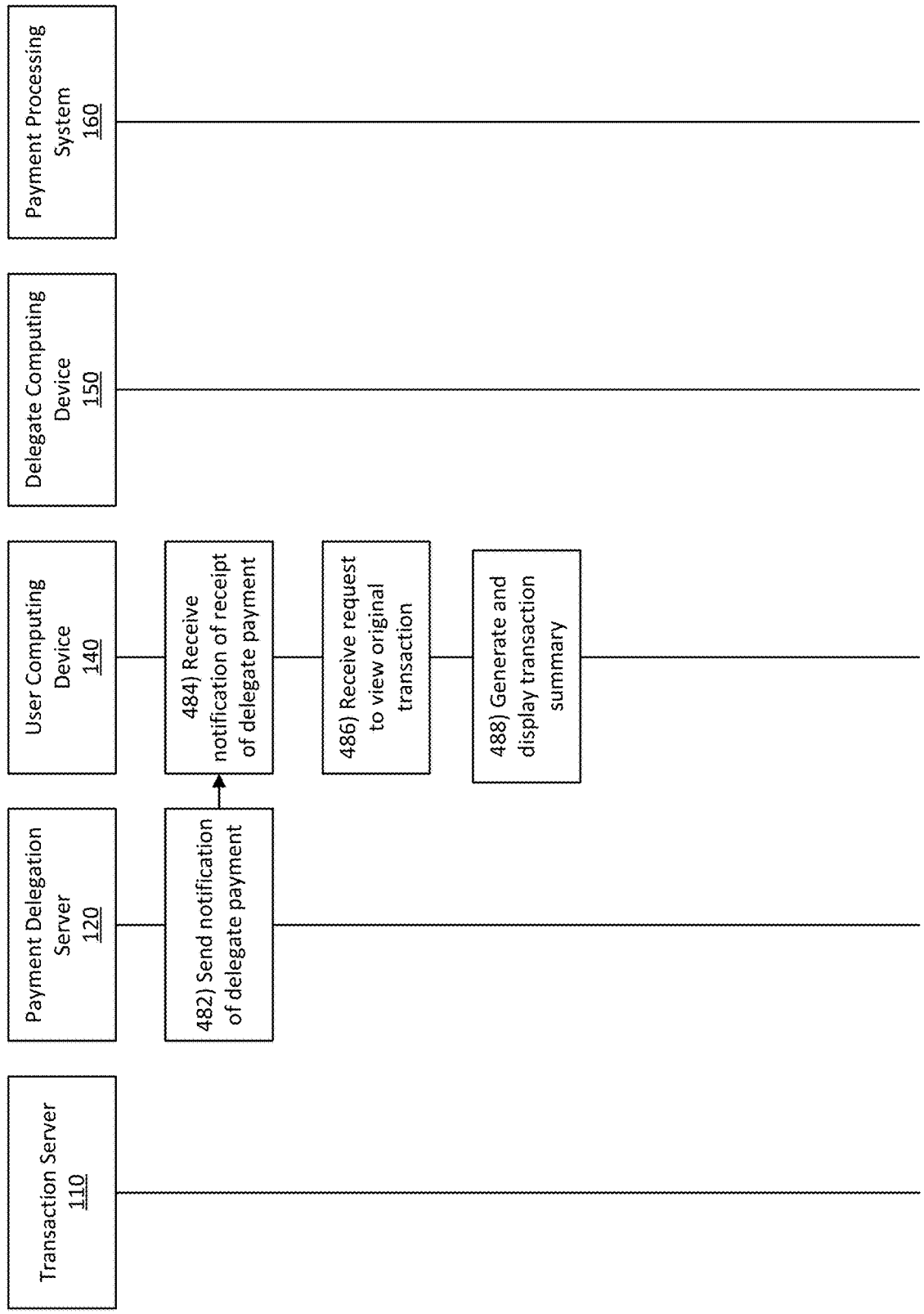

ACH TRANSACTION RECORD

| Record Type | Transaction Code | Receiving Financial Institution ID | Check Digit | Receiver Bank Acct Number | Amount | Individual ID Number | Individual Name | Discretionary Data | Addenda Record Indicator | Trace Number |
|---|---|---|---|---|---|---|---|---|---|---|
| 6 | 22 | 03117611 | 0 | 7840002222 | 22.29 | 1234 | BOB JONES | X78Mq782 | 0 | 5789 |

ACH TRANSACTION RECORD

| Record Type | Transaction Code | Receiving Financial Institution ID | Check Digit | Receiver Bank Acct Number | Amount | Individual ID Number | Individual Name | Discretionary Data | Addenda Record Indicator | Trace Number |
|---|---|---|---|---|---|---|---|---|---|---|
| 6 | 22 | 03117611 | 0 | 7840002222 | 22.29 | 1234 | BOB JONES | Thanks Bob - here's my share! | 1 | 5789674 |

ACH ADDENDA RECORD — 620

| Record Type | Addenda Type Code | Miscellaneous Information | Addenda Sequence Number | Entry Detail Sequence Number |
|---|---|---|---|---|
| 7 | 03 | X78Mq782 | 1 | 5789674 |

FIG. 6B

PAYMENT DELEGATION AND LINKING SYSTEM

FIELD OF USE

Aspects of the disclosure relate generally to payment delegation methods, and more particularly to methods of linking received delegated payments to an original transaction.

BACKGROUND

While some merchants, such as restaurants, may break transactions into multiple payment portions for the sake of consumer convenience, split payments among many individuals is primarily a trick of accounting software or applications, which simply divide a transaction by dollar amount into individual transactions. However, when the number of desired payors increases, the time spent breaking apart a transaction becomes high and a risk of mistakes increases. Ultimately, when processed, the final payment and reconciliation of funds occurs as a function of a single payor making a single payment for each of the individual transactions. Existing systems are limited, however, in their ability to allow a single payor to redirect payments for a given transaction to other payors during a post-payment experience and to manage receipt of payment from such other payors in a manner that allows the original payor to recognize that the received payments are associated with the original transaction.

SUMMARY

The following presents a simplified summary in order to provide a basic understanding of various aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the detailed description below.

Aspects of the disclosure relate to systems, apparatuses, computer-readable media, and methods for facilitating the delegation of partial payments for a purchase transaction and linking received payments back to the original purchase transaction. A user may purchase an item and wish to share the cost of that purchase with one or more other individuals. The user, post-payment, may use a banking application to request partial payment from the one or more individuals directly from the transaction account from which the user made payment. Delegation requests for the partial payments may be sent to the one or more individuals, and the delegation requests may be embedded with a payment token used to link received payments from the one or more individuals to the original purchase transaction. When the individuals initiate payment to the user, the embedded token may be stored in an unused field of a payment transaction record transmitted to a payment processor for processing and settlement. The payment transaction record may ultimately be received at the user's bank with the payment token intact. The payment token may be used to link the received payment transaction with the original purchase transaction. The original purchase transaction and any corresponding received delegated payments may be displayed together in the banking application.

These and other features and advantages of the disclosure will be apparent from the detailed description provided below.

BRIEF DESCRIPTION OF THE DRAWINGS

Some features are shown by way of example, and not by limitation, in the accompanying drawings. In the drawings, like numerals reference similar elements.

FIGS. 4A-4G depict an example sequence for performing payment delegation and linking functions, in accordance with one or more aspects described herein.

FIGS. 6A-6B are example payment transaction records used in performing payment delegation and linking functions, in accordance with one or more aspects described herein.

DETAILED DESCRIPTION

Figure 1:
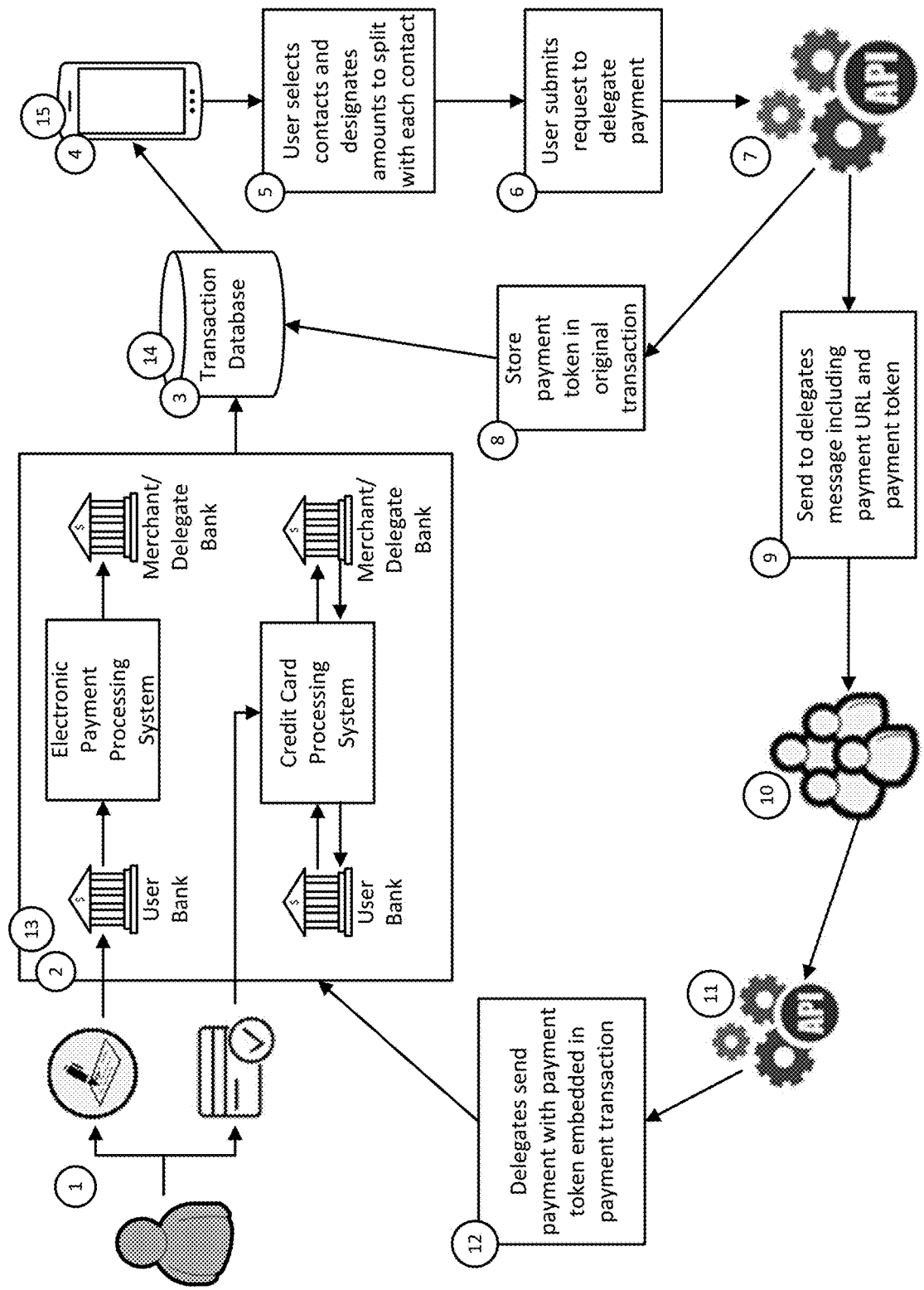
FIG. 1 illustrates an example payment delegation and linking process, in accordance with one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Aspects described herein improve the functioning of computers by improving the process by which shared payments are processed and managed. At present, sharing payments with others is time-consuming, subject to human error particularly when payment needs to be made by multiple individuals, and lacking in the ability to connect received payments with an original transaction at the source. Current systems are unable to address this problem, because such systems are generally third-party systems employed to assist users in requesting split payments. Because such third-party systems are not source systems, e.g., they do not source the transaction, they do not have access to the information or data necessary to actively manage receipt of split payments and associate such received payments with their original counterpart transactions. When split payments are received by such systems they are received as nondescript transactions with no means for identifying or connecting the payments with an original transaction for which a request for payment was made. By providing computers, associated with financial institutions such as banks, with the ability to manage and link received split payments with a corresponding original transaction, organizations, such as financial institutions, may be able to seamlessly provide users with an efficient and convenient means of managing their own financial data. Such improved systems simplify the transaction splitting process for both the merchant and the consumer. The merchant does not need to maintain splitting software and manage the receipt of multiple payments from multiple consumers for a single transaction and, instead, is able to process and receive payment from a single consumer for a single transaction. And the consumer is provided with a single source—the consumer's bank—for managing splitting requests and for receipt of payments associated with such requests. The consumer is able to conveniently manage the splitting of transactions, at their primary source, directly through the consumer's banking application.

Aspects discussed herein may relate to methods, systems, devices, and computer-readable media for a payment delegation and linking system.

Referring to FIG. 1, an example payment delegation and linking process is illustrated. Initially, a user may make a payment to a merchant using, for example, a debit card or a credit card for a purchase made with the merchant. The merchant may send the payment to a transaction or payment processing system for coordinating settlement between the merchant bank and the user's bank. For instance, the payment processing system will coordinate receiving payment from the user's bank and sending the payment to the merchant's bank. From the user's perspective, upon settlement a record associated with the user's purchase transaction may be received at the user's bank and may be stored in a database, such as a transaction database maintained by the bank, and the user's bank account may be debited for the amount of the purchase. The user may thereafter access his bank account through a banking application executing on a user device or on a website associated with the user's bank and may view the various transactions associated with the user's bank account. The user may make a selection of a transaction, via the banking application, and may request that the selected transaction be split amongst one or more other individuals. For instance, the user may wish to split the cost of a lunch purchased for himself and some friends. The user may select one or more contacts from his user device, or from an account, such as a social media account, associated with the user, or may enter contact information for individuals with whom he would like to split the selected transaction. The user may further designate specific amounts to request from each of the selected individuals. For example, if the lunch bill were $50, the user may request $20 from a first individual and $15 from a second individual. After designating specific amounts to each of the selected individuals, the user may submit a request to send a delegation request for the designated payment amounts to each of the selected individuals. A script, such as an application programming interface (API), providing an interface between the banking application and a payment delegation server maintained by the bank, may be executed to generate a payment token which uniquely identifies the delegated transaction. The payment token may be stored together with the delegated transaction in the transaction database, for instance in a memo field or other unused field associated with the delegated transaction. The script and/or API may additionally generate a payment uniform resource identifier (URL) for each of the selected individuals, i.e., the delegates. The payment URL may include parameters containing information about the delegation request as it pertains to the individual delegate for whom the URL is generated. For instance, the information may identify the requestor using a name, email address, phone number, or the like, identify the original/delegated transaction by name or description, indicate a total payment amount delegated to the individual, and identify a financial institution/account where payment should be sent. The URL parameters may additionally include the generated payment token identifying the delegated transaction. A message including a corresponding generated payment URL may be sent to each of the delegates indicating that the user requests payment for the designated amount. The delegates may each receive, at a corresponding delegate device, a message requesting payment and may initiate payment by selecting the payment URL included in the message. Selecting the payment URL may cause a script, such as an API, to execute at the delegate device. The script executing at delegate device may cause an application associated with a default payment method used by the delegate's device to be executed. The script may further cause payment fields associated with the payment application to be prepopulated with the information sent in the payment URL, such as a requestor name, email address, or phone number, a payment amount, information indicating where the payment should be sent, etc. The delegate may make adjustments as needed, such as changing the payment amount to a different amount. The script may additionally cause a payment transaction record generated by the payment application and associated with the delegate's payment to be embedded with the payment token that was sent in the payment URL. The payment token may be embedded in an unused field of the payment transaction record. As a result, when the delegates send their payment, the payment transaction record may be sent to the payment processing system with the payment token embedded therein. The payment processing system may then coordinate settlement between the delegate's bank and the user's bank. When the delegate's payment is eventually received at user's bank, the payment transaction may be stored in the bank's transaction database and the user's account may be credited for the payment amount. Further, upon receiving the payment transaction, the payment token embedded in the payment transaction may be detected. Such a detection may indicate that the received payment transaction is associated with another transaction for which the user requested delegated payments. The payment token may be used to identify the original/delegated transaction and the payment transaction may then be linked to the original transaction. The user may be notified that a payment associated with a delegated transaction has been received and the user may access his online bank account, via the banking application, to view the original transaction together with any received payments from the delegates showing as linked with the original transaction. For example, the delegated transaction may be displayed with all payments received from delegates underneath. Alternatively, the user may select the delegated transaction and a list of all requested payments received from delegates may be displayed in response. In this way, a user may easily and conveniently track payments received in connection with a request to delegate payment for a given transaction.

Figure 2:
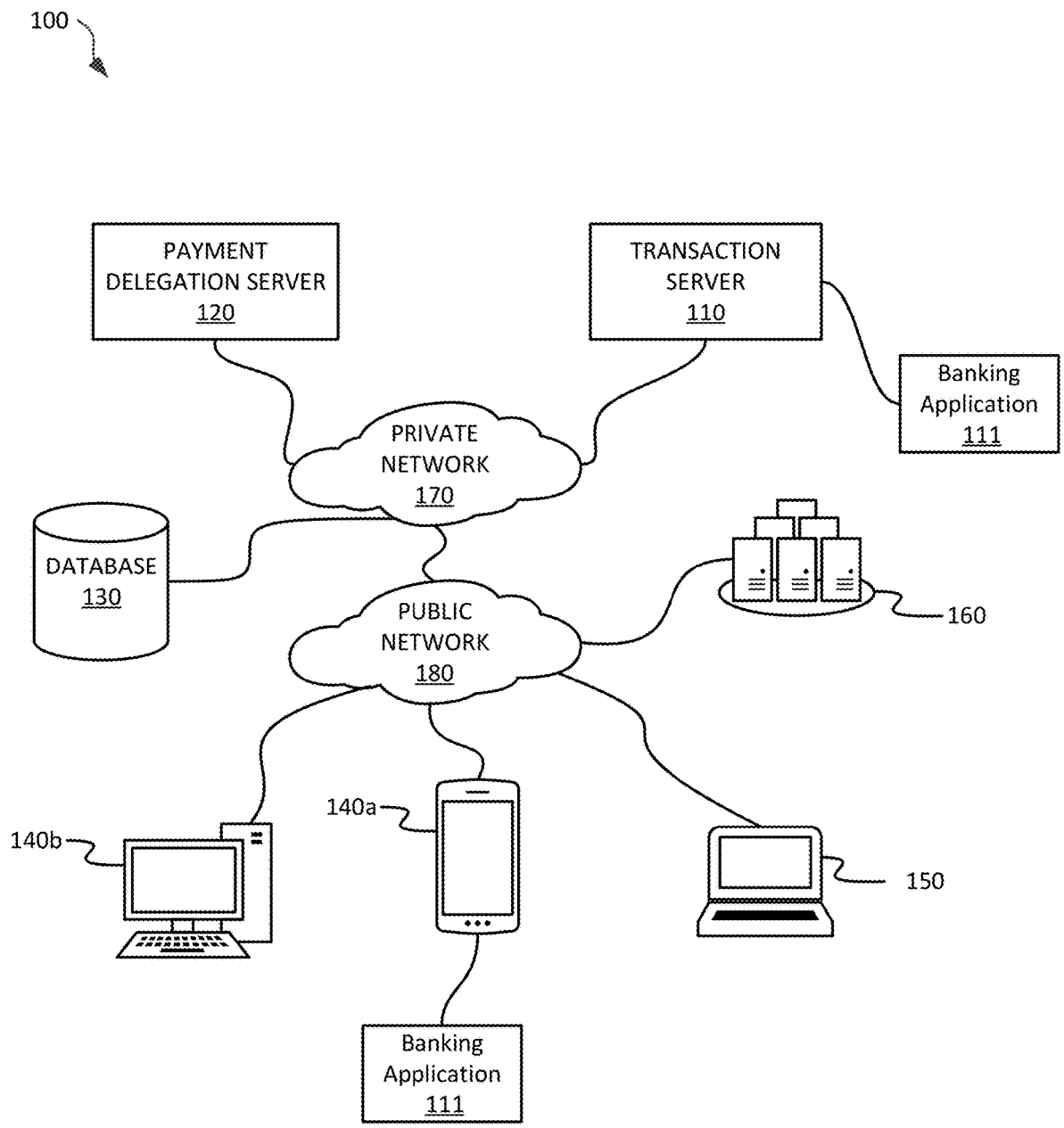
FIG. 2 is a diagram of an example computing environment for a payment delegation and linking system, in accordance with one or more aspects described herein.

Referring to FIG. 2, an example computing environment for a payment delegation and linking system 100 is provided. The payment delegation and linking system 100 may include one or more systems or computing devices, such as a transaction server 110, a payment delegation database 120, a database 130, one or more user computing devices 140 (e.g., a first user computing device 140a and/or a second user computing device 140b), one or more delegate computing devices 150, a payment processing system 160, a private network 170, and a private network 180. Although the various systems and computing devices in the computing environment 100 are shown and described as separate devices, one or more of the computing devices, may be part of a single computing device without departing from the disclosure.

The transaction server 110 may be a computing device, such as a server, used by a banking institution or other financial institution to provide functionality associated with transaction processing. Users may hold a transaction account, such as a bank account, a credit card account, a commercial account, a line of credit, or the like, maintained by the banking institution. The transaction server 110 may control processing bank transactions associated with the transactions, such as deposits made to the account, payments made from at the account, credits and/or debits to the account, transferring funds between accounts and/or banks, or the like. The transaction server 110 may store and/or control a banking application 111 for providing the user with online access to the user's account.

Accordingly, the banking application 111 may be associated with the user's bank account, credit card account, commercial account, line of credit, or the like. The banking application 111 may be used by the user to perform various account-related functions, such as viewing account transactions, making payments, depositing checks, transferring funds, sending funds, etc. Additionally or alternatively, the banking application 111 may be used to facilitate splitting or delegating portions of a transaction associated with a user's transaction account. As will be described below in further detail, the banking application 111 may generate and display one of more user interfaces that allow the user to select a transaction and provide inputs related to requesting payments from one or more individuals for some portion of the transaction amount, to view delegation requests, and to view delegated payments received for a delegated transaction. The banking application 111 may be a server-based application installed and executed at the transaction server 110. The server-based banking application 111 may be accessed through a website, such as a banking website, by a client device, such as by the second user computing devices 140b. Additionally or alternatively, the banking application 111 may be a client-based application installed and executed on a client device, such as the first user computing device 140a.

The payment delegation server 120 may be a computing device, such as a server, used by a banking institution or other financial institution to provide functionality associated with coordinating delegation requests for payment of portions of a transaction and linking received delegate payments with an original delegated transaction. The payment delegation server 120 may communicate with the transaction server 110 and the database 130, via the private network 170, in coordinating and processing the delegation requests.

The database 130 may store information used by the transaction server 110, the banking application 111, and/or the payment delegation server. The database 120 may comprise one or more of a relational database, a hierarchical database, a distributed database, an in-memory database, a flat file database, an XML database, a NoSQL database, a graph database, or the like.

The one or more user computing devices 140, e.g., first user computing device 140a and/or the second user computing device 140b, may be configured to communicate with and/or connect to one or more computing devices of the computing environment 100 via the public network 160. In some instances, the one or more user computing devices 140 may have installed thereon one or more applications for performing one or more aspects described herein. For instance, the first user computing device 140a may store an application, such as the banking application 111, for accessing a bank account, credit card account, commercial account, line of credit, or the like. In some instances, the one or more user computing devices 140 may access one or more applications installed on the transaction server 110 for performing one or more aspects described herein. For instance, the second user computing device 140b, may access, using a web site, and via the public network 180, the banking application 111 installed at the transaction server 110.

The one or more user computing devices 140 may be any type of computing device or combination of devices capable of performing the particular functions disclosed herein. For example, the one or more user computing devices 140 may be and/or include server computers, desktop computers, laptop computers, tablet computers, smart phones, fitness devices, or the like that may include one or more processors, memories, communication interfaces, storage devices, and/or other components. The one or more user computing devices 140, in some instances, may be or include special-purpose computing devices configured to perform the functions disclosed herein. In some instances, some or all of the functionality of the transaction server 110 may instead be performed by any of the one or more user computing devices 140 alone or in combination with the transaction server 110.

The one or more delegate computing devices 150 may be computing devices associated with delegates who receive a delegation request for payment of a portion of a transaction. The one or more delegate computing devices 150 may be configured to communicate with and/or connect to one or more computing devices of the computing environment 100 via the public network 160. In some instances, the one or more delegate computing devices 150 may have installed thereon one or more applications for performing one or more aspects described herein. For instance, the first user computing device 140a may store an application, such as the banking application 111, for accessing a bank account, credit card account, commercial account, line of credit, or the like. In some instances, the one or more user computing devices 140 may access one or more applications installed on the transaction server 110 for performing one or more aspects described herein. For instance, the one or more user computing devices 150, may access, using a website, and via the public network 180, the banking application 111 installed at the transaction server 110. The one or more delegate computing devices 150 may additionally have installed thereon, or may access via a website using the public network 180, one or more payment applications for making an electronic payment, such as PAYPAL, APPLE PAY, GOOGLE PAY, SAMSUNG PAY, ZELLE, VENMO, CASHAPP, or the like. The payment application may be used to make a payment of a delegated amount to a user, in accordance with aspects described herein.

The one or more user computing devices 140 may have integrated therein an image capturing device for capturing an image, such as a receipt image, or scanning a code, such as a bar code or a quick response (QR) code. For instance, the image capturing device may be one of one or more sensors of the one or more user computing devices 140, and one or more applications installed on the one or more user computing devices 140 may cause the image capturing device to be activated and to capture an image or scan a code. The captured image may be stored on the one or more user computing devices 140 and/or on a different device. In some cases, the image capturing device may be used to capture one or more images of a receipt for use in extracting line item data for a corresponding transaction. In some cases, the image capturing device may be used to scan a barcode, QR code, or the like displayed on a receipt to provide further information about the transactions provided on the receipt. In some cases, the one or more user computing devices 140 may use an image capturing device that is separately embodied from the one or more user computing devices 140. When separately embodied, the image capturing device may, in some cases, be communicatively connected to the one or more user computing devices 140 and may be controlled by the one or more user computing devices 140. In some instances, the image capturing device, might not be connected to the one or more user computing devices 140. In some instances, the image capturing device may be communicatively connected to the public network 180 and may be configured to transmit images to the one or more user computing devices 140, the transaction server 110, and/or to other devices via the public network 180.

The payment processing system 160 may comprise one or more computing devices associated with a payment processing network of systems and devices associated with merchants, clearinghouses, financial institutions, and the like that interact with one another to process, authorize, and settle payment transactions, such as a credit card transaction or an Automated Clearing House (ACH) transaction. For instance, a credit card payment processing system may receive a request from a merchant point of sale system for authorization of a purchase transaction made with a credit card. The payment processing system 160 may send information associated with the purchase transaction to a system associated with the banking institution that issued the credit card. The banking institution system may execute one or more processes to make an authorization determination. For example, the banking institution system may assess potential fraud associated with the purchase transaction and may confirm the account holder has sufficient credit to cover the purchase amount. The banking institution system may send the authorization determination back to the payment processor system 160 for approval or denial of the purchase transaction. If approved, the payment processor system 160 may additionally coordinate payment from the credit card issuing bank and the merchant bank. In this case, the credit card issuing bank may receive the purchase transaction at a transaction server and/or database, such as the transaction server 110 and/or the database 130, and may perform one or more functions to cause the user's account to be credited for the payment amount associated with the purchase transaction. Additionally, in the case of an electronic payment processing system, such as the ACH network, when a user authorizes an ACH payment to a merchant directly from the user's bank account, the merchant bank may send a request for payment to the payment processing system 160 and the payment processing system 160 may in turn send a request to the user's bank for the payment. The user's bank may confirm whether the user has sufficient funds to make the payment and, in this case the user's bank may receive and process the payment transaction via a transaction server and/or database, such as the transaction server 110 and/or the database 130, and may perform one or more functions to cause the payment to be debited from the user's bank account. The user's bank may further send a request to the payment processor 160 to coordinate payment to the merchant bank.

The private network 170 may be a network operated by, and internal to, an organization or business, such as a banking institution. The private network 170 may be used to interconnect one or more computing devices internal to the organization or business. The private network 170 may further connect to the public network 180. The private network 170 may include one or more of local area networks (LANs), wide area networks (WANs), virtual private networks (VPNs), or the like.

The public network 180 may connect the private network 170, and/or the one or more computing devices connected thereto, to one or more networks, systems, and/or computing devices that might not be associated with the organization, such as the one or more user computing devices 140 and the one or more delegate computing device 150. The public network 180 may include one or more networks, such as the Internet.

Figure 3:
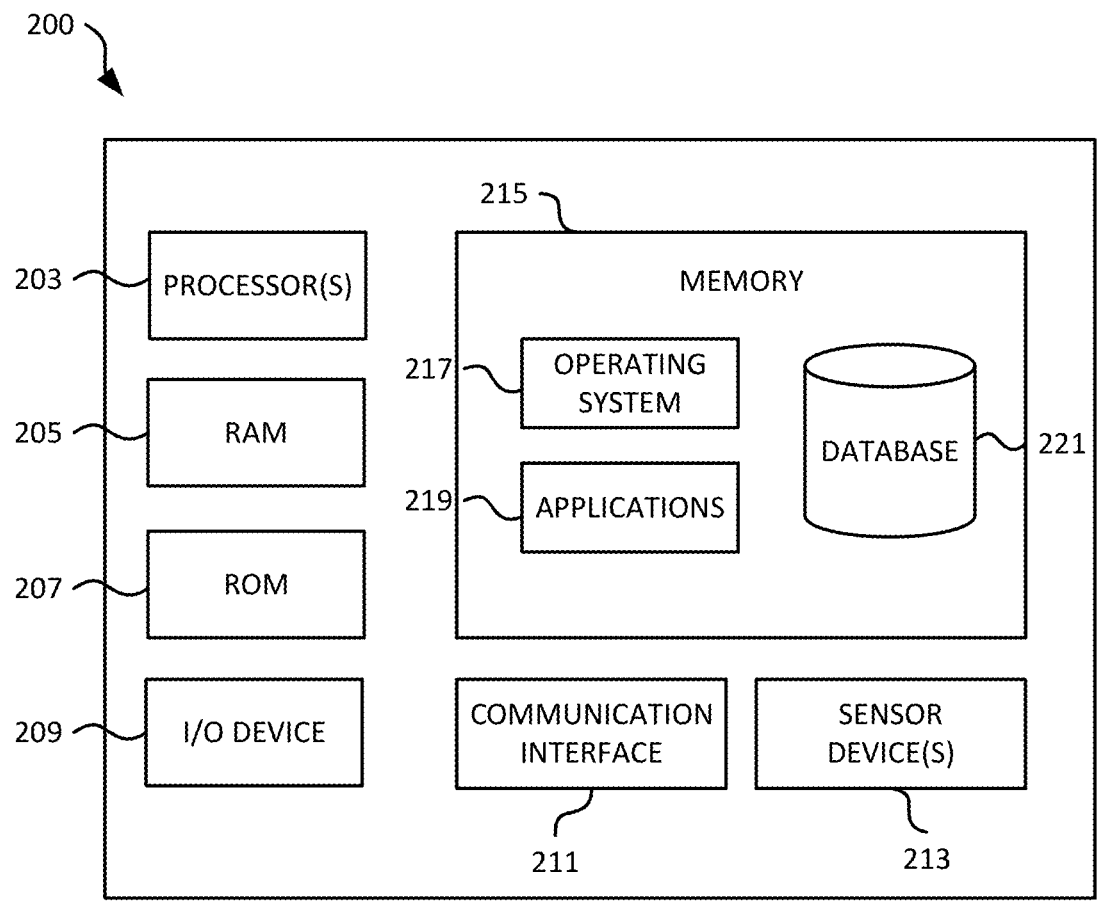
FIG. 3 illustrates an example computing device for use in a payment delegation and linking system, in accordance with one or more aspects described herein.

Referring to FIG. 3, an example computing device 200 is provided. The example computing device 200 may include or incorporate any one of the transaction server 110, the payment delegation server 120, the database 130, the one or more user computing devices 140, the one or more delegate computing devices 150, or the payment processing system 160. In some instances, the computing device 200 may represent, be incorporated in, and/or include various devices such as a desktop computer, a computer server, a mobile device, such as a laptop computer, a tablet computer, a smart phone, or any other types of mobile computing devices, and/or any other type of data processing device.

The computing device 200 may include one or more components, such as one or more processors 203, a random access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the memory 215, the I/O device 209, the communication interface 211, and/or the one or more sensor devices 211. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

The I/O device 209 may include, but need not be limited to, a microphone, keypad, touch screen, and/or stylus, through which a user of the computing device 200 may provide input, and may also include one or more of a speaker for providing audio output, and a video display device for providing textual, audiovisual, and/or graphical output.

The communication interface 211 may include one or more transceivers, digital signal processors, and/or additional circuitry and software for communicating via a network (e.g., the public network 160, the private network 170, or the like), wired or wireless, using any protocol as described herein.

The one or more sensor devices 213 may include one or more of an accelerometer, a gyroscope, a GPS device, a biometric sensor, a proximity sensor, image capturing device, a magnetometer, etc.

The memory 215 may store software to provide instructions to the one or more processors 203 allowing the computing device 200 to perform various actions. For example, the memory 215 may store software used by the computing device 200, such as the operating system 217, applications 219, and/or the database 221. The various hardware memory units in the memory 215 may include volatile and nonvolatile, removable and non-removable media implemented in any method or technology for storage of information, such as computer-readable instructions, data structures, program modules, or other data. The memory 215 may include one or more physical persistent memory devices and/or one or more non-persistent memory devices. The memory 215 may include, but need not be limited to, the RAM 205, the ROM 207, electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the one or more processors 203.

Although various components of the computing device 200 are described separately, functionality of the various components may be combined and/or performed by a single component and/or multiple computing devices in communication without departing from the disclosure.

Referring to FIGS. 4A-4G, an example event sequence for performing payment delegation and linking functions is provided, referring FIGS. 5A-5J, example user interfaces used in performing the payment delegation and linking functions are provided, and referring to FIGS. 6A and 6B example transaction records using in performing the payment delegation and linking functions are provided.

Referring to FIG. 4A, at step 402, a payment for a purchase may be made to a merchant using the user computing device 140. For instance, a user of the user computing device 140 may make a payment to a merchant for goods or services purchased from the merchant by the user. In some instances, the user may use a payment method associated with the user computing device 140, such as through a mobile payment application installed on the user computing device 140. In some instances, the payment may be made without using the user computing device 140. For instance, the user may make a payment to the merchant with a physical credit card, with a check, by wire, as an ACH payment, etc.

The payment may initially be received by a point of sale or payment system associated with the merchant and the merchant payment system (not shown) may transmit the payment transaction to a payment processing system, such as the payment processing system 160, for processing the transaction and coordinating the settlement process. Accordingly, at step 404, the payment processing system 160 may receive the payment transaction associated with the payment made by the user to the merchant. The payment processing system 160 may be, for example, a credit card processing system, an electronic payment processing system, such as the ACH system, or the like. The payment transaction need not be transmitted directly from the user computing device 140, but may instead be transmitted indirectly through a merchant payment system associated with the merchant to whom the user made the payment. The payment processing system 160 may coordinate a settlement process between a bank associated with the merchant and a bank associated with the user.

For instance, at step 406, the payment processing system 160 may coordinate sending transaction information to the user's bank so funds for payment may be debited from a payment account associated with the user's payment method and may be transmitted to the merchant bank. The merchant bank may credit an account associated with the merchant for the payment amount.

At step 408, a server associated with the user's bank, such as the transaction server 110, may receive the transaction information associated with the payment. The transaction information may be stored in the database 130, and the transaction server may cause the payment account of the user to be debited for the payment amount. The payment account may be, for example, a bank account, a credit card account, a commercial account, a line of credit, or the like.

Figure 5A:
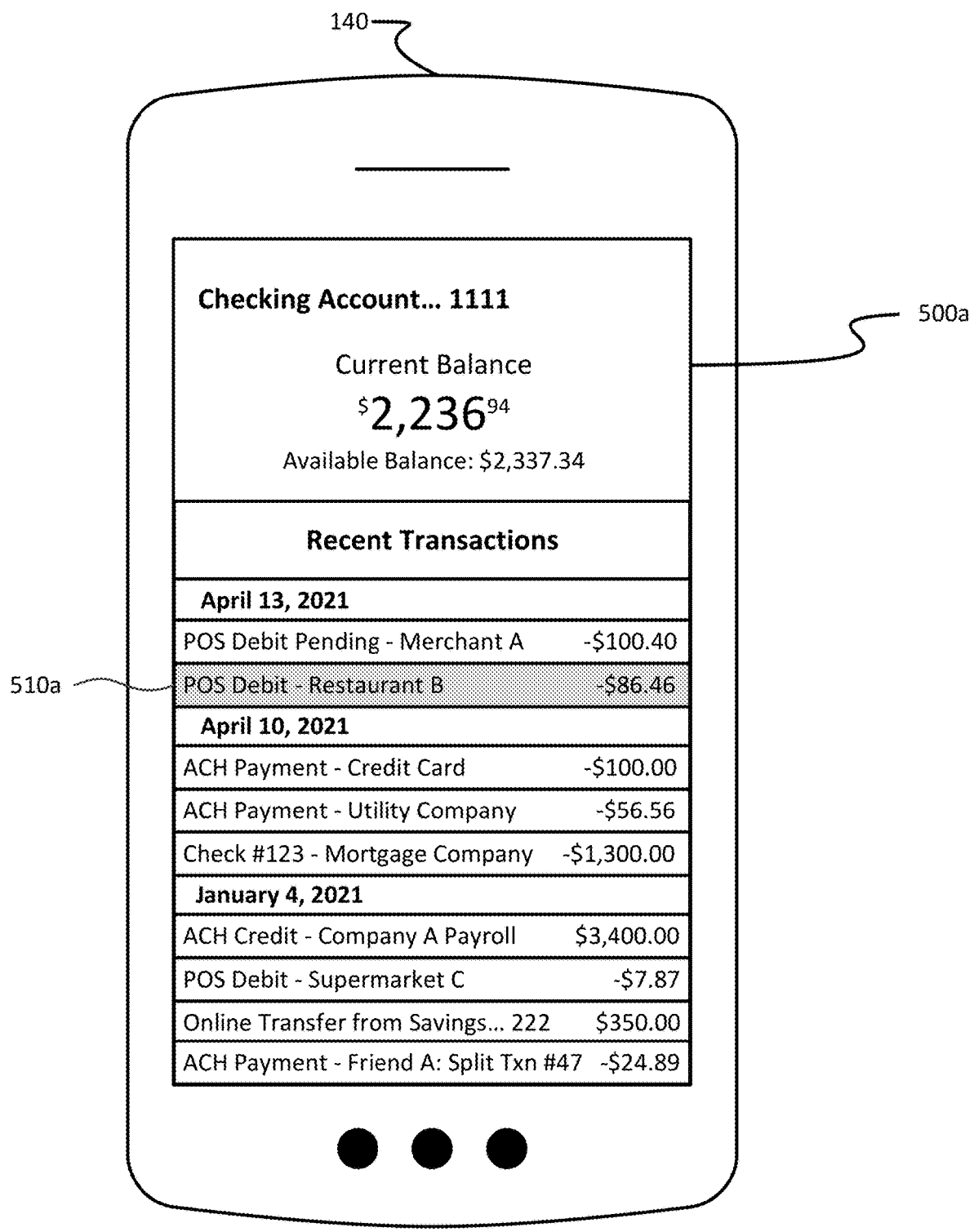
FIGS. 5A-5J are example user interfaces used in performing payment delegation and linking functions, in accordance with one or more aspects described herein.

After the payment transaction has been processed and settled, the user may access or view the transaction through a banking application associated with the payment account from which the user made the payment for the purchase. Accordingly, at step 410, the user may use the user computing device 140 to access a banking application, such as the banking application 111, to view transactions associated with the user's payment account. For instance, as shown in FIG. 5A, the banking application 111 may output a user interface 500*a* that displays a list of transactions associated with the payment account and stored in the database 130.

Figure 5B:
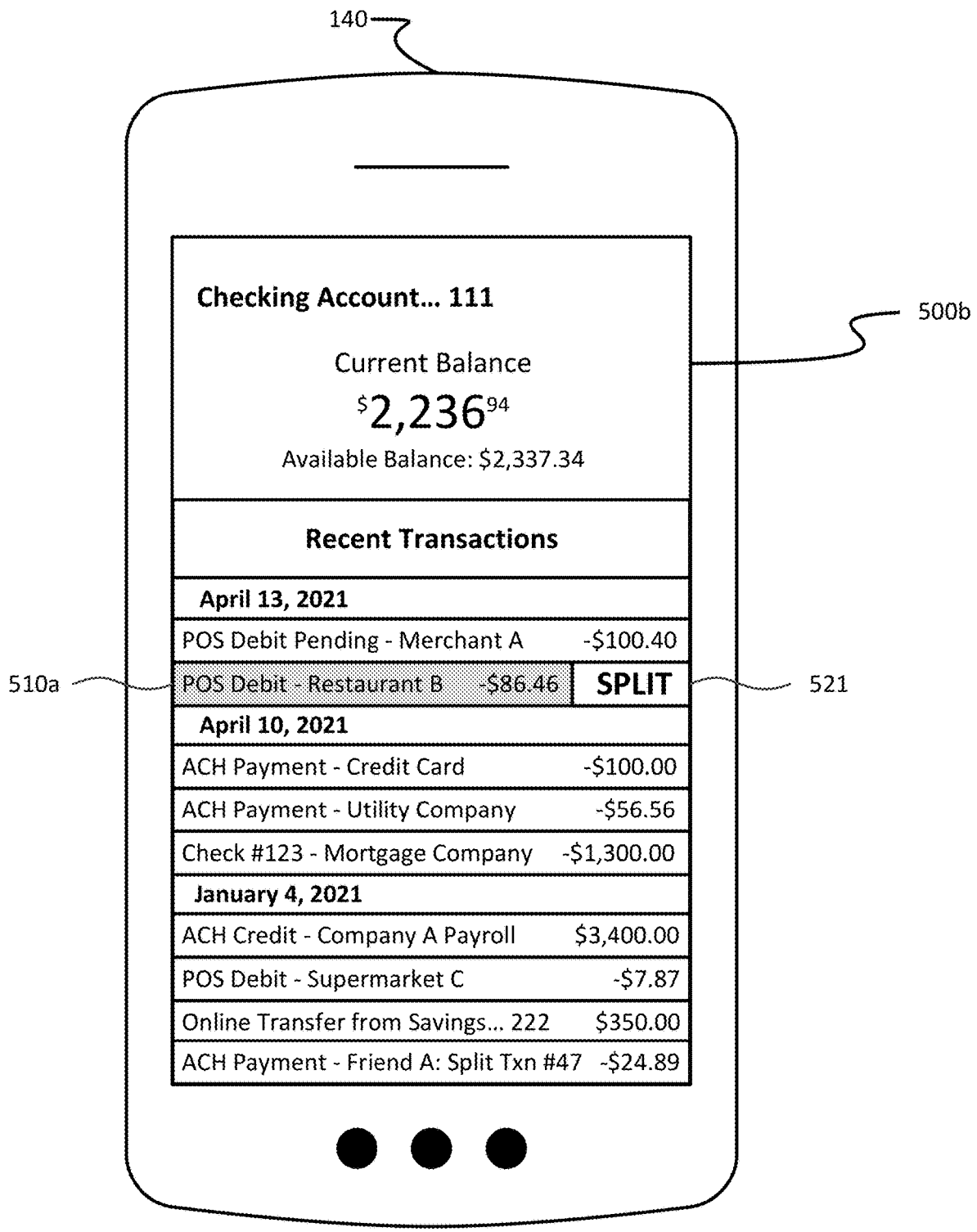
Figure 5C:
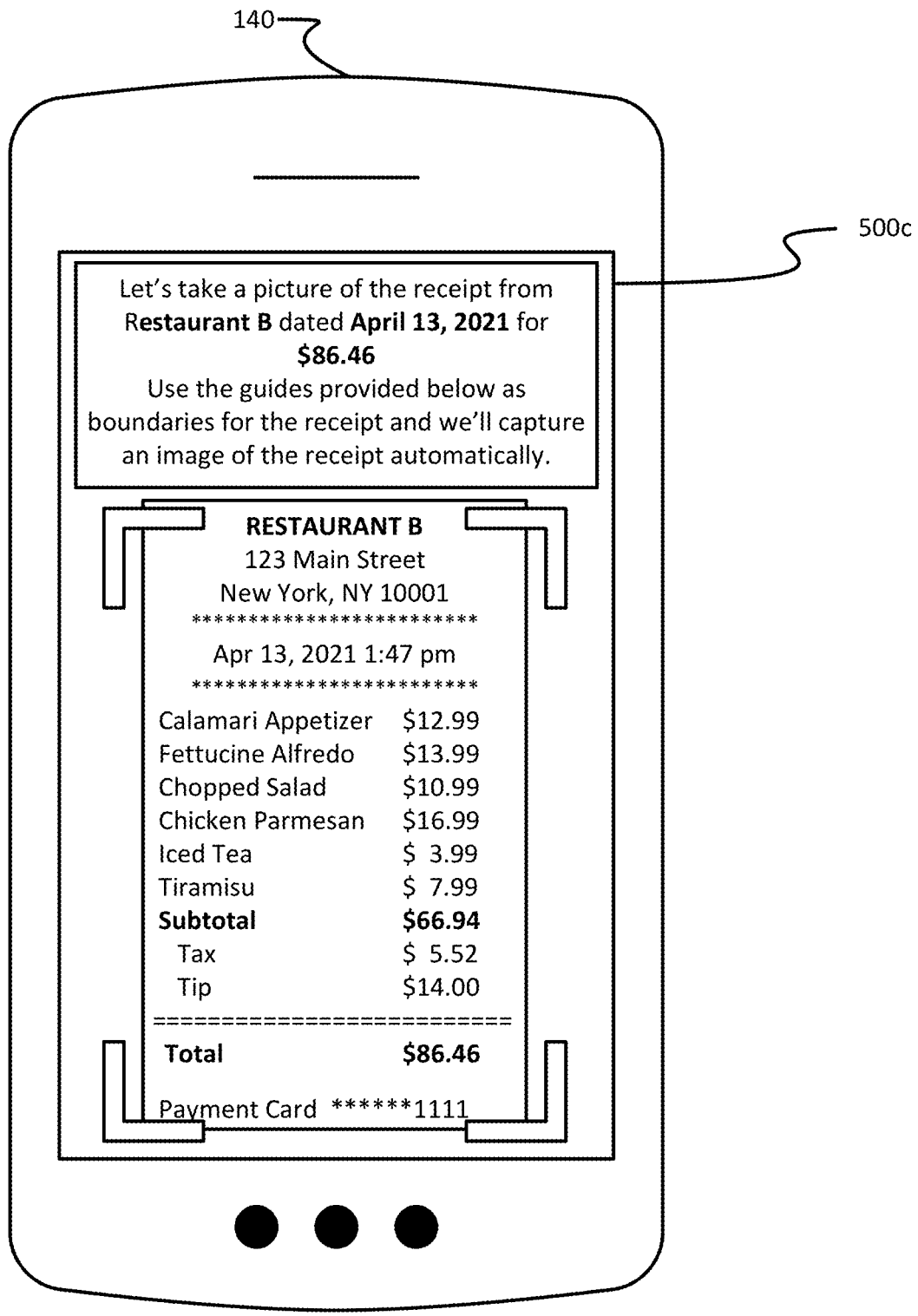

The user may decide to split or delegate a payment amount associated with a purchase made by the user. For instance, the user may have paid for lunch shared by the user and two friends. For convenience, the user may have made a payment for the full cost of the lunch, but may wish to request that his friends pay for their share of the lunch. At step 412, the user may make a selection, at the user computing device 140 and via the banking application 111, of the transaction associated with a purchase the user made at Restaurant B, such as transaction 510*a* shown in FIG. 5A. Selecting the transaction may cause one or more options for interacting with selected transaction to be displayed. For instance, selecting the transaction may cause an option for splitting or delegating the transaction to be displayed. For example, as shown in FIG. 5B, a user interface 500*b* may display a split option 521 associated with the selected transaction 520*a*. The user may select the split option 521 to initiate a request to split the transaction At step 414, the user computing device 140 may determine whether the selected transaction is an enhanced transaction having detailed transaction information associated with the transaction and stored in the database 130. That is, in some instances, when the transaction server 110 initially receives the transaction, such as at step 408, the transaction server 110 may additionally receive detailed information about the transaction from a merchant device associated with the merchant associated with the purchase transaction. The merchant device may transmit to the transaction server 110 the line item information associated with the purchase transaction. The line item information may include a name or description of each item purchased, a price of each item, and/or a quantity of each item purchased. The line item information may be stored together with the associated transaction in the database 130 to enhance the commonly provided transaction information, which may include only a merchant name, a merchant location, a total amount, and payment information. In some instances, the user may upload the line item information associated with a transaction, by manually entering such information in a user interface provided by the banking application 111 or by using the banking application 111 to capture an image of a receipt associated with the transaction. The banking application 111 and/or the transaction server 110 may process the receipt using one or more image analysis and/or computer vision techniques, such as optical character recognition (OCR), object recognition, or the like, to convert one or more portions of the image of the receipt into text. After converting the image of the receipt to text, the user computing device 140 may analyze the converted text to extract the line item information from the text. In some cases, the receipt may include a bar code or QR code, which may be used to retrieve line item information from an associated merchant device. The line item information provided by the user, manually or via the receipt upload, may be stored together with the associated transaction in the database 130 to enhance the transaction. The transaction may additionally be flagged as an enhanced transaction to indicate the presence of the line item information. Accordingly, at step 414, the user computing device 140 may determine whether the transaction is flagged as an enhanced transaction.

If the user computing device 140 determines at step 414 that the selected transaction is not flagged as an enhanced transaction then, referring to FIG. 4B, at step 416, the user computing device 140 may cause the banking application 111 to output a request to the user to provide the transaction item information associated with the selected transaction. In some instances, the user may be provided with a user interface, such as user interface 500c shown in FIG. 5C, to capture and/or upload an image of a receipt associated with the selected transaction.

At step 418, the user computing device 140 may receive the receipt image and may process the receipt using one or more image analysis and/or computer vision techniques, such as optical character recognition (OCR), object recognition, or the like, to convert one or more portions of the image of the receipt into text. After converting one or more portions of the image of the receipt to text, the user computing device 140 and/or the transaction server 110 may analyze the converted text to extract the line item information from the text. In some instances, the receipt may have printed thereon a bar code or a QR code, which may be embedded with information identifying the receipt transaction, with the line item information, and/or with a link to a script that may cause the transaction identifying information (such as a unique transaction identifier, the merchant name, the merchant location, a date/time of the transaction, the transaction amount, a payment method, etc. or a combination thereof) and/or the line item information (such as a description, an amount, a quantity, a pro rata tip amount, pro rata tax amount, or the like) to be requested and retrieved from a merchant device associated with a merchant associated with the receipt. In such cases, upon capturing the image of the receipt the user computing device 140 may detect the bar code or QR code and may receive or retrieve the transaction identifying information and/or the line item information using the bar code or the QR code. In some instances, the user may be provided with a user interface to manually enter the transaction item details associated with the transaction. For instance, a user interface providing a form for entering the details for each line item (such as a description, an amount, a tax amount, a tip amount, or the like) may be output in the banking application 111.

At step 420, the user computing device 140 may cause the extracted, retrieved, or entered line item information to be stored together with the selected transaction in the database 130. The transaction may additionally be flagged as an enhanced transaction. In some instances, the line item information may additionally be stored in a memory of the user computing device 140 for immediate use.

If the user computing device 140 determines at step 414 that the transaction is flagged as an enhanced transaction then, at step 422, the user computing device 140 may send a request to the transaction server 110 to retrieve, from the database 130, the line item information associated with the selected transaction.

At step 424, the transaction server 110 cause the line item information associated with the selected transaction to be retrieved from the database 130.

At step 426, the transaction server 110 may send the line item information to the user computing device 140 or may otherwise cause the line item details to be displayed in by the user computing device 140 via the banking application 111.

Figure 5D:
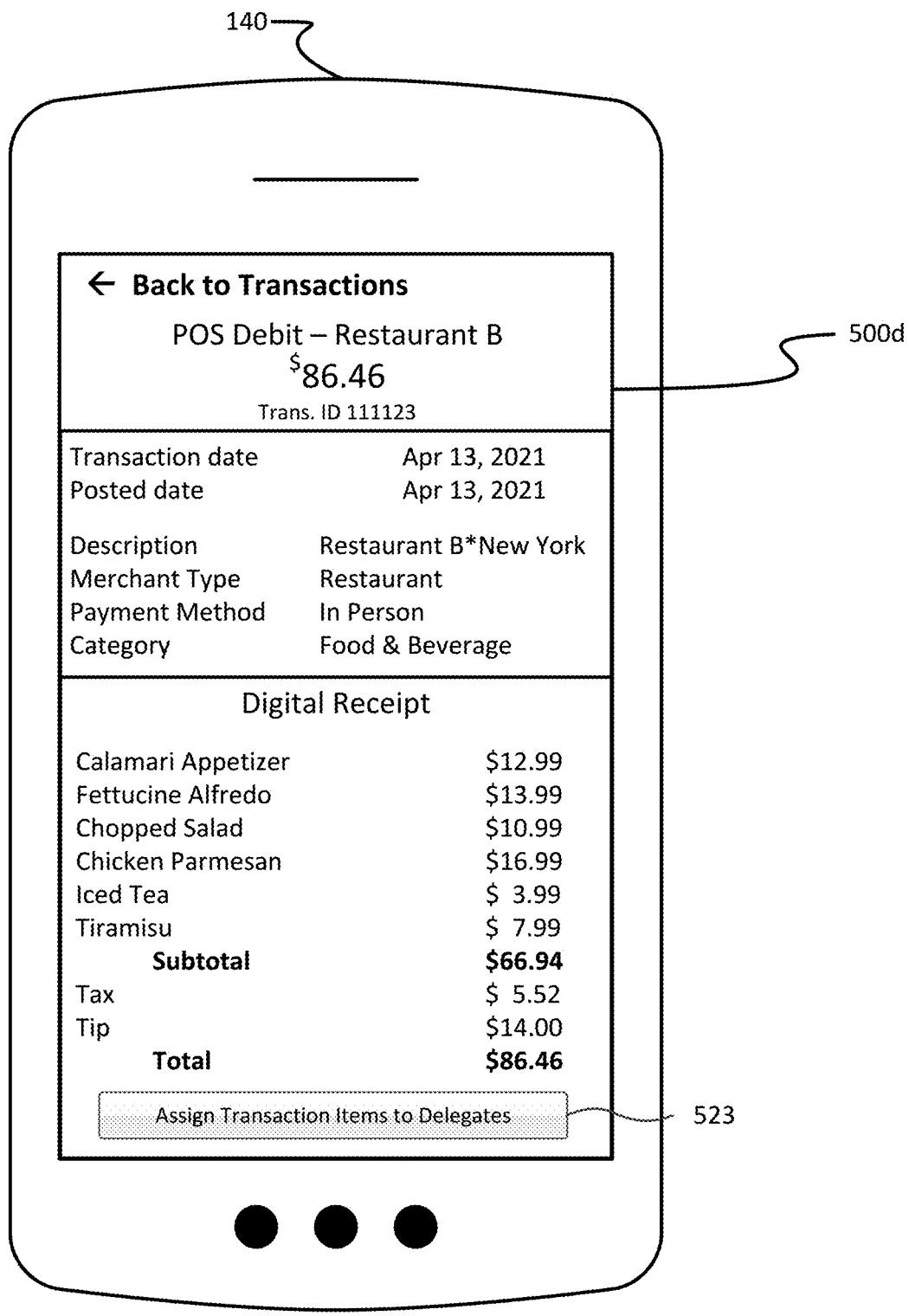

At step 428, the user computing device 140 may receive the line item information associated with the selected transaction and may use the line item information to generate a digital receipt associated with the selected transaction for display in the banking application 111. For instance, as shown in FIG. 5D, the user computing device 140 may cause the banking application 111 to output a user interface 500d displaying a digital receipt for the selected transaction including the line item information associated with the transaction.

Figure 4C:
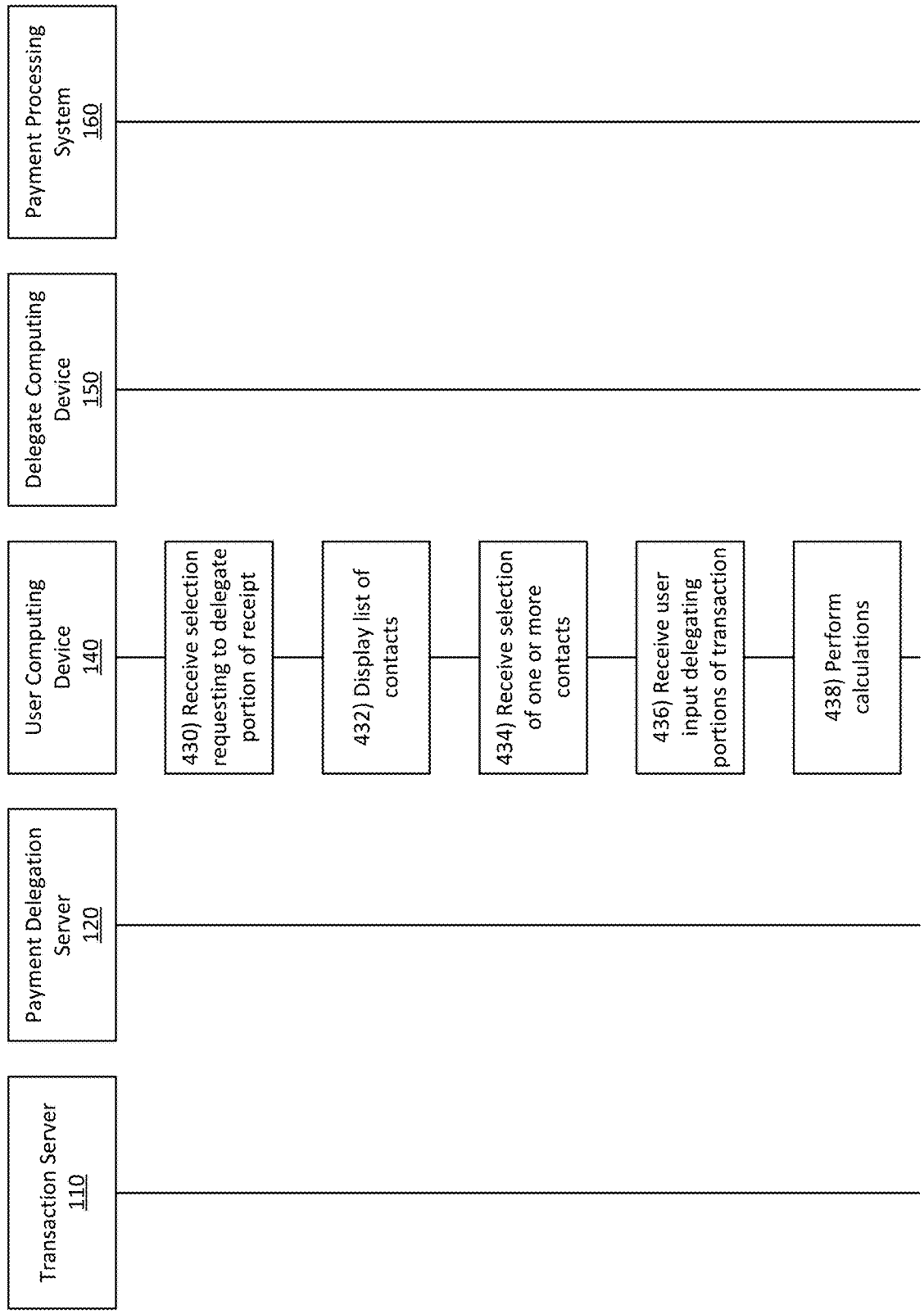

Referring to FIG. 4C, at step 430, the user computing device 140 may receive a user selection requesting that one or more portions of the receipt or transaction be delegated to one or more individuals. For instance, the user computing device 140 may receive an indication of a selection of option 523 shown in user interface 500d in FIG. 5D.

At step 432, in response to the user selection requesting that one or more portions of the receipt or the selected transaction be delegated to one or more individuals, the user computing device 140 may cause the banking application 111 to output a user interface displaying a list of contacts from which the user may select individuals to whom portions of the receipt or portions of the transaction should be delegated. For instance, the user computing device 140 may request permission from the user to access the user's contacts stored in a memory of the user computing device 140 and/or at a memory source accessible by the user computing device 140 and/or to access and analyze an account, such as a social media account, email account, or the like, associated with the user to obtain contacts and corresponding contact information. In some cases, the user computing device 140 may query a third-party service to obtain the contact information, such as a phone number, email address, social media handle, or the like. The user computing device 140 may generate a list of those contacts and corresponding contact information and may output the list via the banking application 111, such as shown in user interface 500e shown in FIG. 5E.

Figure 5E:
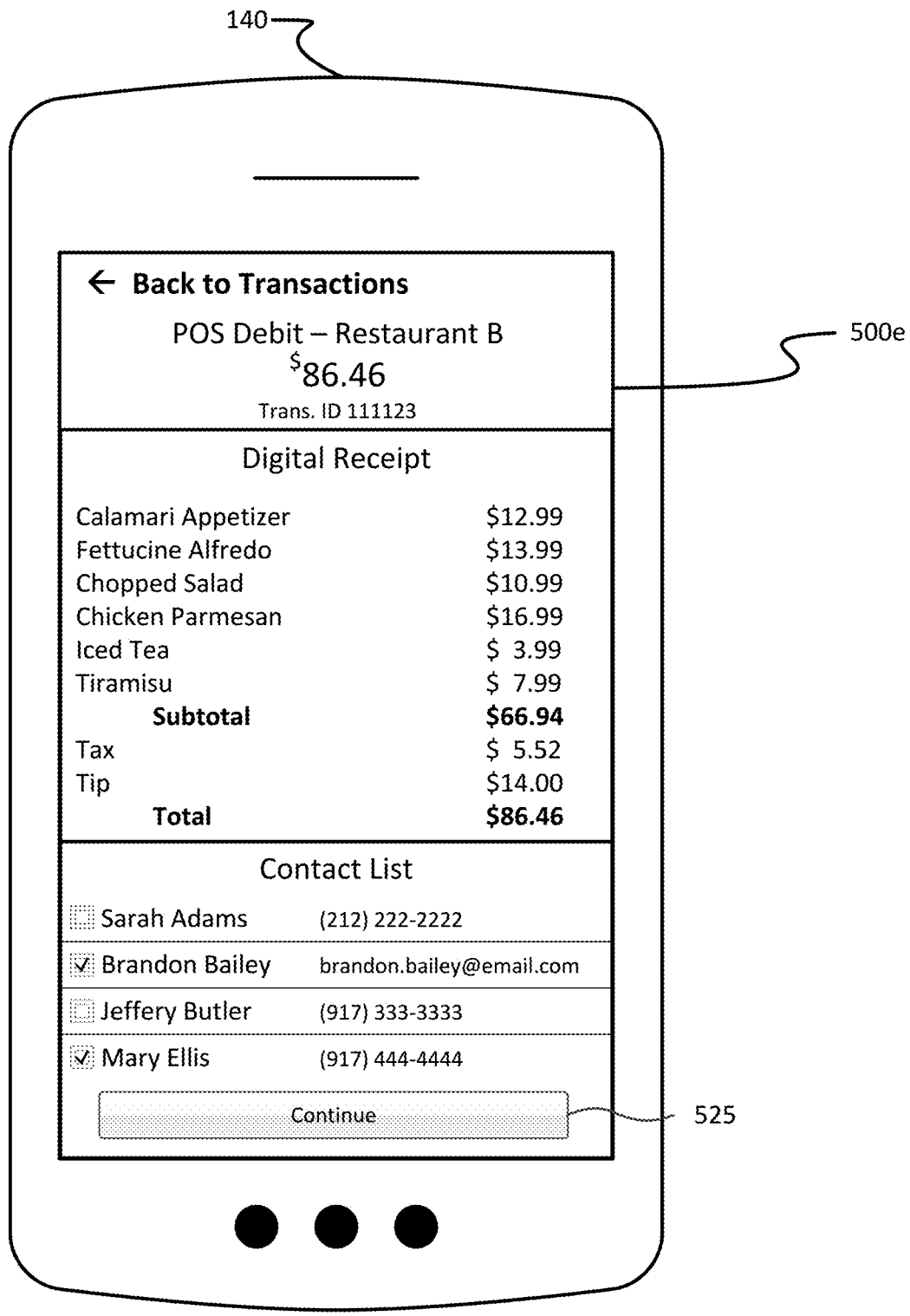
Figure 5F:
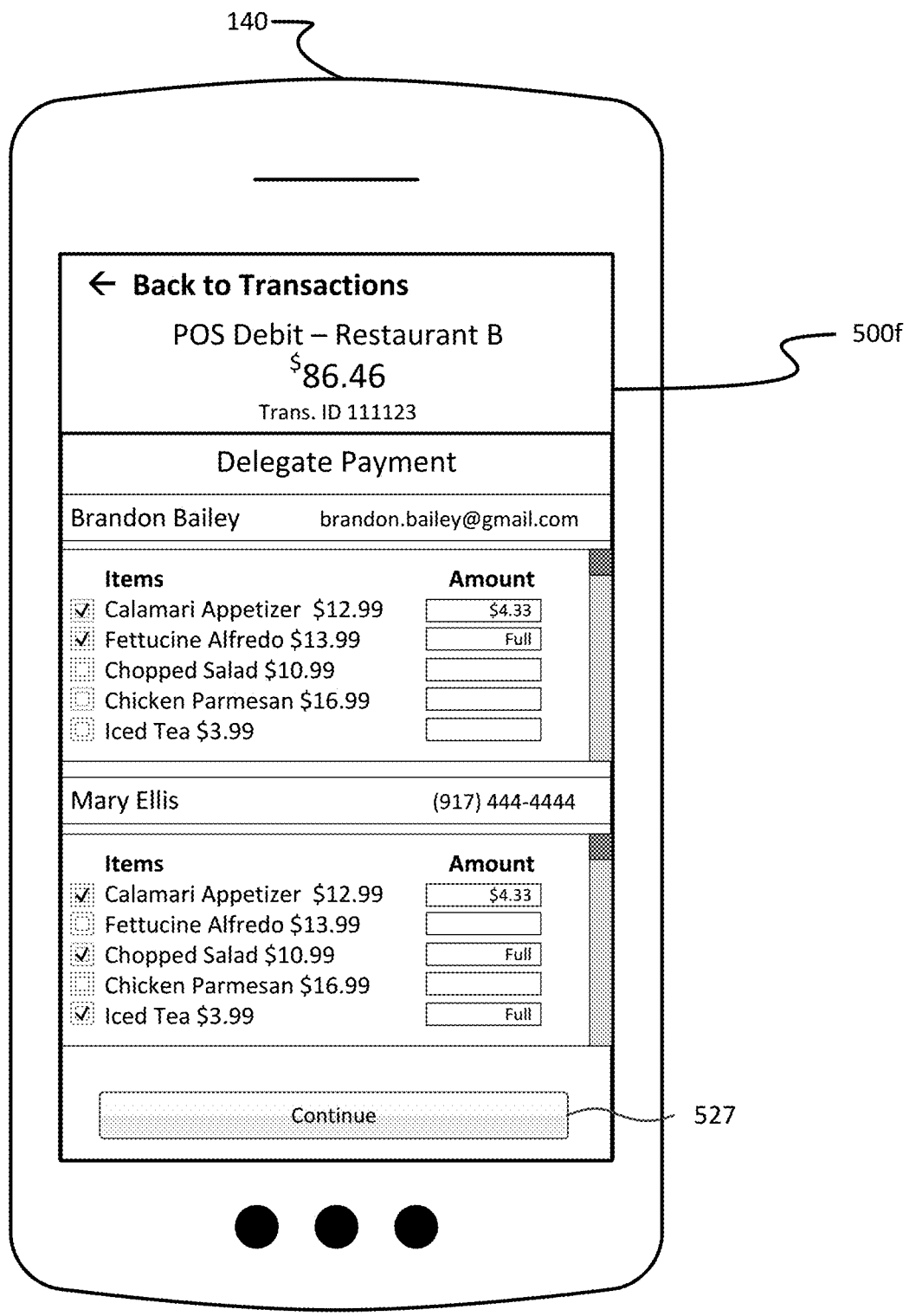

At step 434, the user computing device 140 may receive an indication of a user selection of one or more of the contacts for delegating one or more portions of the receipt or transaction, as shown in FIG. 5E.

At step 436, the user computing device 140 may cause the banking application 111 to output a user interface that displays each of the selected one or more contacts and options for receiving user inputs indicating one or more portions of the receipt to be delegated to each of the selected one or more contacts. For instance, the user computing device 140 may cause the banking application 111 to generate a user interface such as user interface 500f shown in FIG. 5F. The user may select individual items from the receipt to delegate to each of the selected individuals. In some cases, the user may allocate to the selected individual a full payment amount for a particular item or may allocate a partial payment amount for the particular item. In some instances, the user need not delegate particular items to the selected individuals, and may instead input a particular dollar amount associated with the transaction or receipt, or a particular percentage of the total of the transaction or receipt.

After the user has indicated the manner in which the receipt items and payment amounts should be delegated, at step 438, the user computing device 140 may automatically perform certain calculations associated with the request to delegate payment. For instance, the user computing device 140, where applicable, may calculate a portion of any tax and/or tip to allocate to each of the selected individuals. The user computing device 140 may cause an equal portion to be allocated to each individual or, in some cases, may cause the banking application 111 to provide an option in the user interface to receive a user input of a particular amount of each the tax and/or the tip to allocate to the selected individuals, and the user may input a particular dollar amount or a percentage of the total of the tax and/or the tip. The user computing device 140 may additionally perform other calculations. For instance, if the user is requesting payment from more than one individual, the user computing device 140 may confirm that the total requested amount does not exceed a total amount associated with the selected transaction. In the event that the total requested amount does exceed the total amount associated with the selected transaction, the user computing device 140 may cause the banking application 111 to output a user interface displaying an error message and instructions to the user to correct the requested amounts. After the user has made any necessary corrections, the user computing device 140 may cause the banking application 111 to output a user interface that displays a total amount to be delegated to each of the selected individuals and may display an option for the user to submit the request.

Figure 4D:
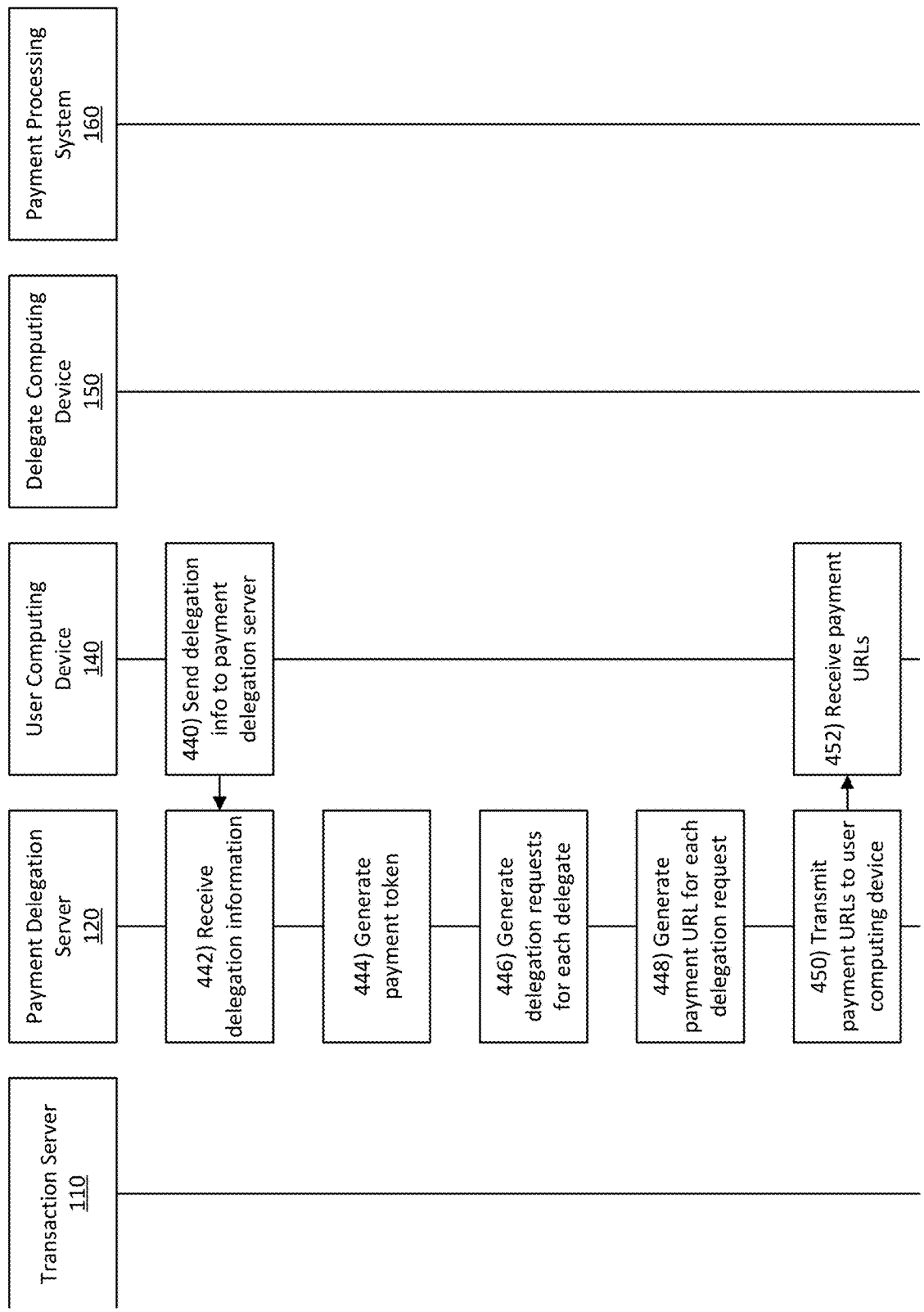

Referring to FIG. 4D, at step 440, upon receiving, at the user computing device 140 and via the banking application 111, an indication of a user selection to submit the request to delegate payment of the selected transaction, the user computing device 140 may transmit information associated with the request to the payment delegation server 120. The information sent to the payment delegation server 120 may include information identifying the transaction being delegated. The computing device 140 may retrieve, from the transaction server 110 and/or the database 130, information associated with the transaction to be deleted. For instance, computing device 140 may retrieve and include in the delegation request a transaction identifier, which uniquely identifies the transaction being delegated, a transaction description, a transaction value or amount, a transaction date, or the like. The information may additionally include the details associated with the individuals to whom payment is being delegated, such as the delegate's name and contact information, e.g., email address, phone number, social media handle, etc., and a total amount delegated to each delegate. The information may additionally include details about the individual transaction line items delegated to each delegate, such as a description, and the amount delegated for each individual transaction line item, tax associated with the transaction line item, a portion of the tip associated with the transaction line item, or the like.

At step 442, the payment delegation server 120 may receive the information associated with the request to delegate payment for the selected transaction.

At step 444, the payment delegation server 120 may generate a unique payment token for the transaction identified in the delegation information received from the user computing device 140. The payment delegation server 120 may identify the transaction in the database 130 by the transaction identifier included in the delegation information and may update the transaction record in the database 130 to indicate the generated payment token. The payment delegation server 140 may update a memo, discretionary, miscellaneous, or other unused field associated with the transaction record with the payment token. The payment token may be used to associate the original transaction with subsequent payments received from the delegates. In some cases, the payment token may comprise a URL link to a script configured to access information associated with delegation requests associated with the transaction. The payment token link may be compressed using, for example, a URL shortener to reduce the length of the link for convenience in transmission.

At step 446, the payment delegation server 120 may generate a delegation request for each delegate identified in the delegation information. The delegation request may be associated with the transaction being delegated and may include information, from the received delegation information, that pertains to the particular delegate. For example, the delegation request may include a delegation request identifier, the transaction identifier, a total payment amount or value delegated to the delegate and/or information identifying the individual transaction line items and associated amounts delegated to the individual delegate, and/or contact information for the delegate. The delegation request may be stored in the database 130.

At step 448, the payment delegation server 120 may generate a payment URL for each of the generated delegation requests. The payment URL may include one or more parameters containing information associated with the delegation request. For instance, the URL parameters may include information identifying the individual requesting the payment; the total payment amount delegated to the delegate and/or the information identifying the individual transaction line items and associated amounts delegated to the delegate; and/or information identifying where payment from the delegate should be sent—such as a bank routing number, a bank account number, a credit card number, or the like associated with the user's original form of payment. In some instances, the information identifying where payment should be sent may simply be an email address or phone number of the requesting user, which may be used when payment from the delegate is received at the user's bank to access the user's bank account number or credit card number from a secure source, such as the transaction server 110. The URL parameters may additionally include the payment token generated by the payment delegation server 120 for the delegated transaction. One or more of the URL parameters may be encrypted to ensure security of sensitive information during transmission. In some instances, rather than include all of the aforementioned information in various URL parameters, the payment token itself, included in a parameter of the payment URL, may comprise a URL link to a script configured to request or retrieve the aforementioned information. For instance the payment token link may execute a script configured to request or retrieve, from the payment delegation server 120 or the database 130, some or all of the aforementioned information, such as from the stored delegation request. The payment URL may additionally execute a script configured to initiate a payment process from the delegate to the user.

At step 450, the payment delegation server 120 may transmit the generated payment URLs back to the user computing device 140 for transmission to each of the corresponding delegates; and at step 452, the user computing device 140 may receive the generated payment URLs.

In some instances, the user computing device 140 or the transaction server 110 may perform some or all of the above-noted functions described in steps 442-450 as being performed by the payment delegation server 120.

Figure 4E:
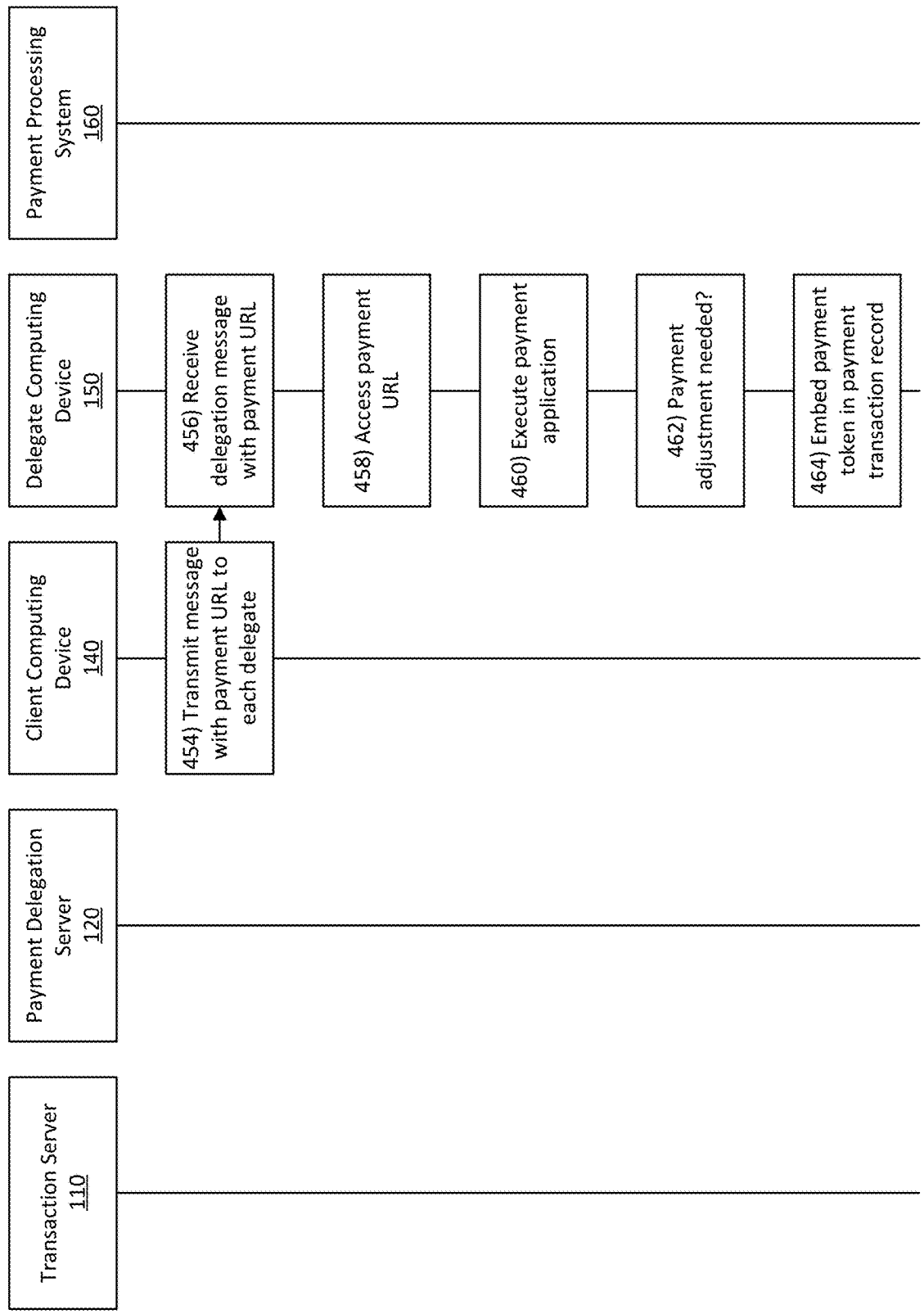

Referring to FIG. 4E, at step 454, the user computing device 140 may generate and transmit a delegation message to each of the delegates using the contact information provided in the delegation request for that delegate and including the corresponding payment URL generated by the payment delegation server 120. The delegation message may request payment for the delegated portions of the transaction indicated in the delegation request. The message may, in some instances, itemize the individual items delegated to the delegate and the associated amounts. The message may additionally, in some instances, include the total amount that the user has requested be delegated to the delegate.

At step 456, the delegate may receive the delegation message transmitted from the payment delegation server 120 at a device used by the delegate, such as the delegate computing device 150. For instance, the delegate computing device 150 may receive a delegation message, such as delegation message 500g shown in FIG. 5G. In the case where the delegate also has the banking application 111 installed at the delegate computing device 150 or has website access to the banking application 111, the delegation message may be output via a user interface of the banking application 111. Alternatively or additionally, the delegation message may be received as an email, a text, via social media, or the like. The delegation message may display the details of the delegation request and the payment URL. In some instances, the details of the delegation request may be displayed upon accessing the payment URL. The delegation message may include options to accept, decline, or transfer the delegation request to another individual. The delegate may select one of the options, and the requesting user may be notified of the selected option. In the case of transferring the delegation request, the transfer option may provide a user interface for receiving contact information, such as an email address or a phone number, of a sub-delegate and receiving an amount to be delegated to the sub-delegate. Upon submission of a request to transfer the delegation request, a script may be executed to update the delegation request stored in the database 130 with information associated with the sub-delegate or to generate a new delegation request associated with the sub-delegate. The updated or new delegation request may be stored in the database 130 and a delegation message may be transmitted to the sub-delegate for payment of the delegated amount. Any payment made by the sub-delegate may be paid to the original requesting user.

Figure 5G:
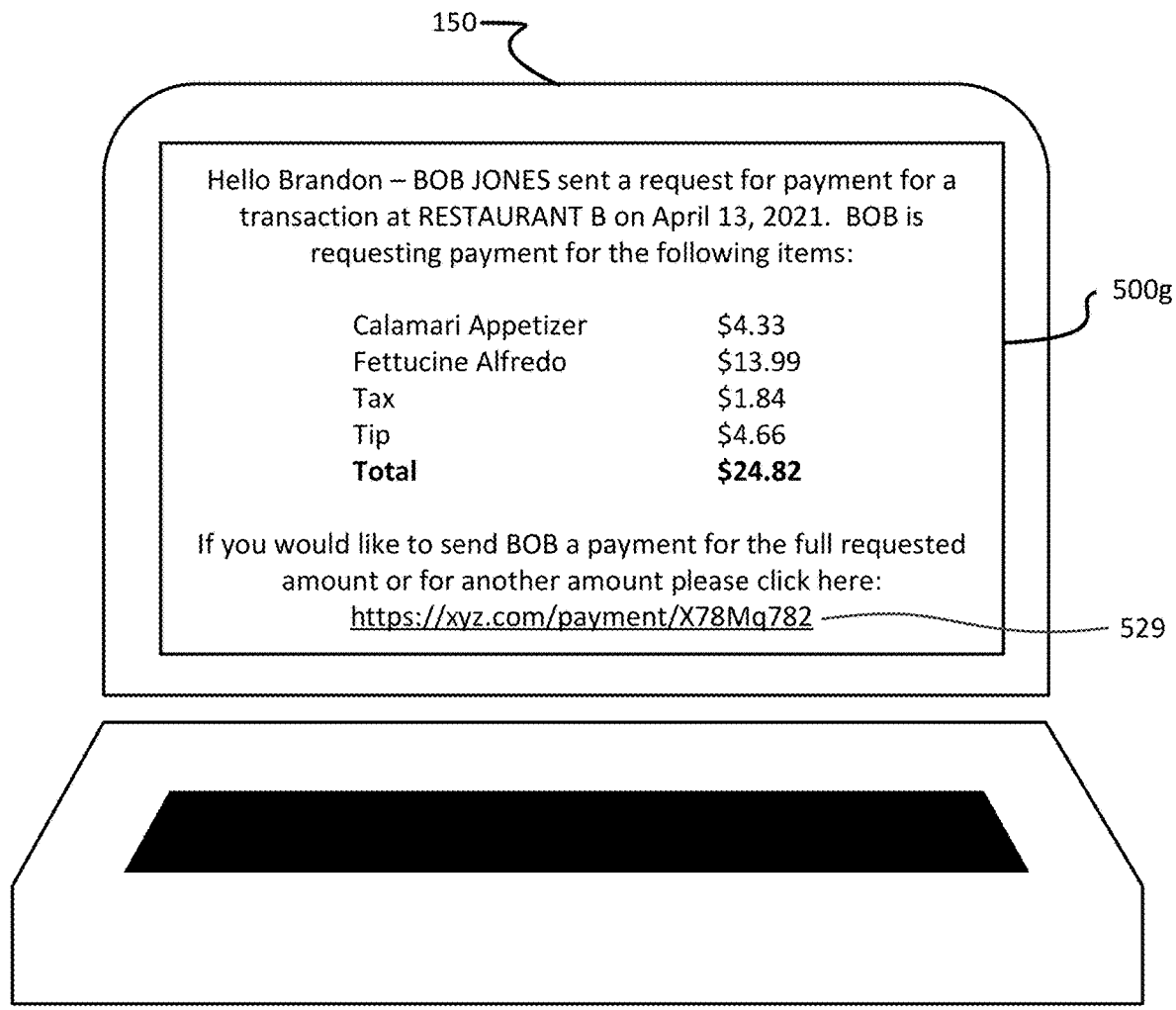

At step 458, if the delegate decides the accept the delegation request, the delegate may access the payment URL by clicking on the link displayed in the delegation message, such as link 529 shown in FIG. 5G, or by copying and pasting the link into a web browser. Accessing the link may cause a payment process to be initiated for submitting payment from the delegate to the requesting user. For instance, accessing the link may trigger the execution of a script at the delegate computing device 150. The script may cause an application or website associated with a default payment method associated with the delegate computing device 150 to be identified and executed. Alternatively or additionally, the script may cause a request to be output at the delegate computing device 150 for the delegate to select a preferred payment method application for using in making payment to the user.

Figure 5H:
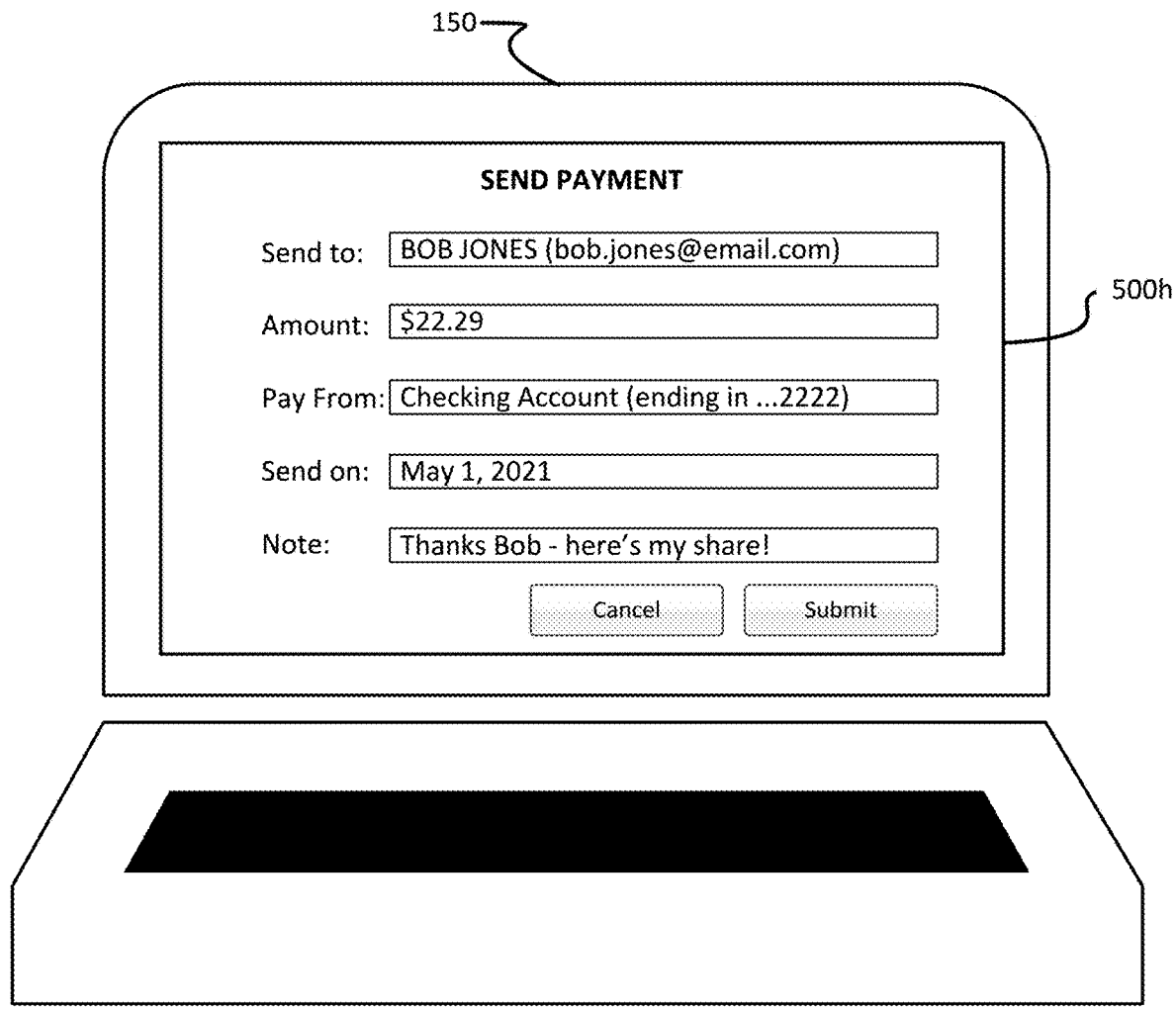
Figure 5I:
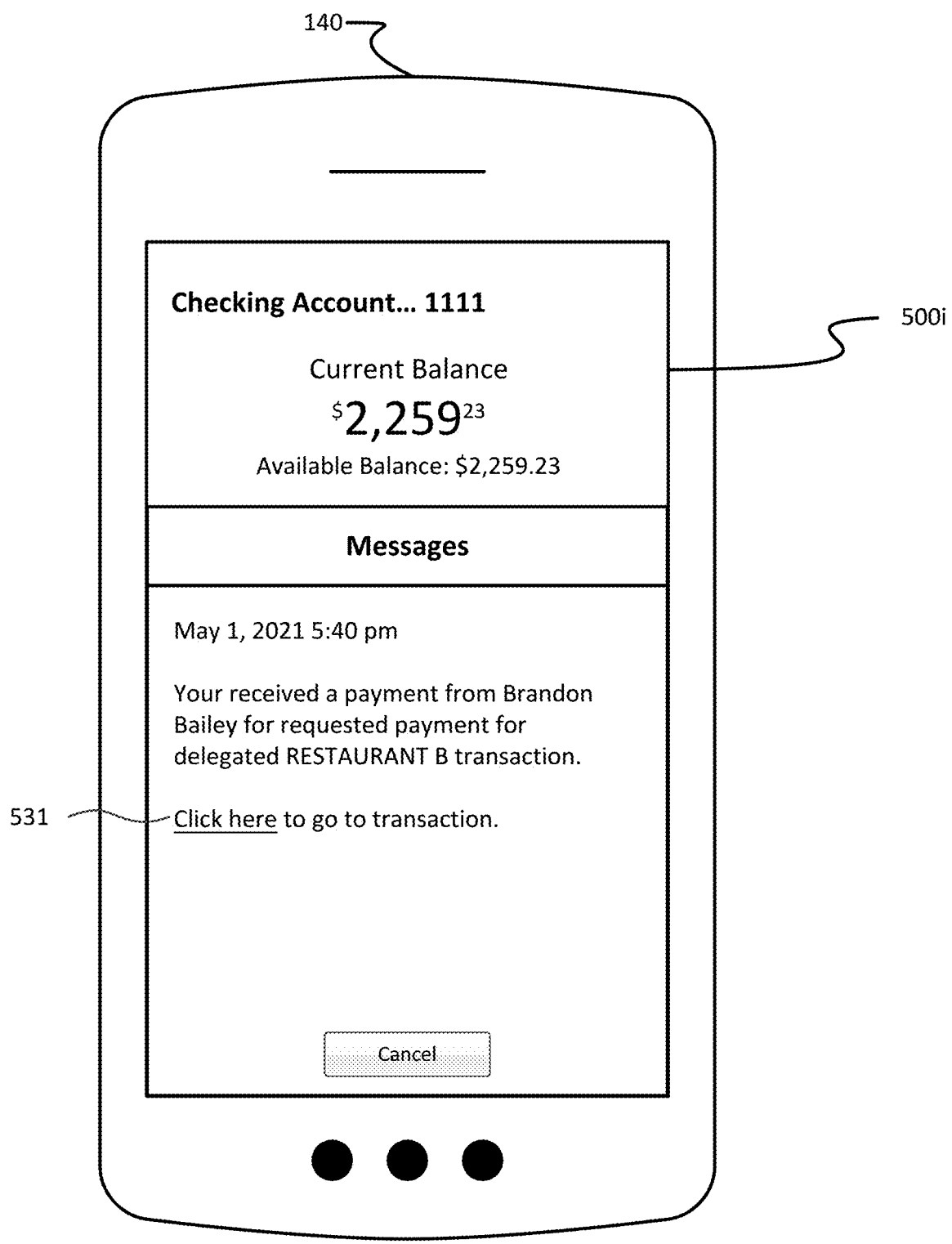
Figure 5J:
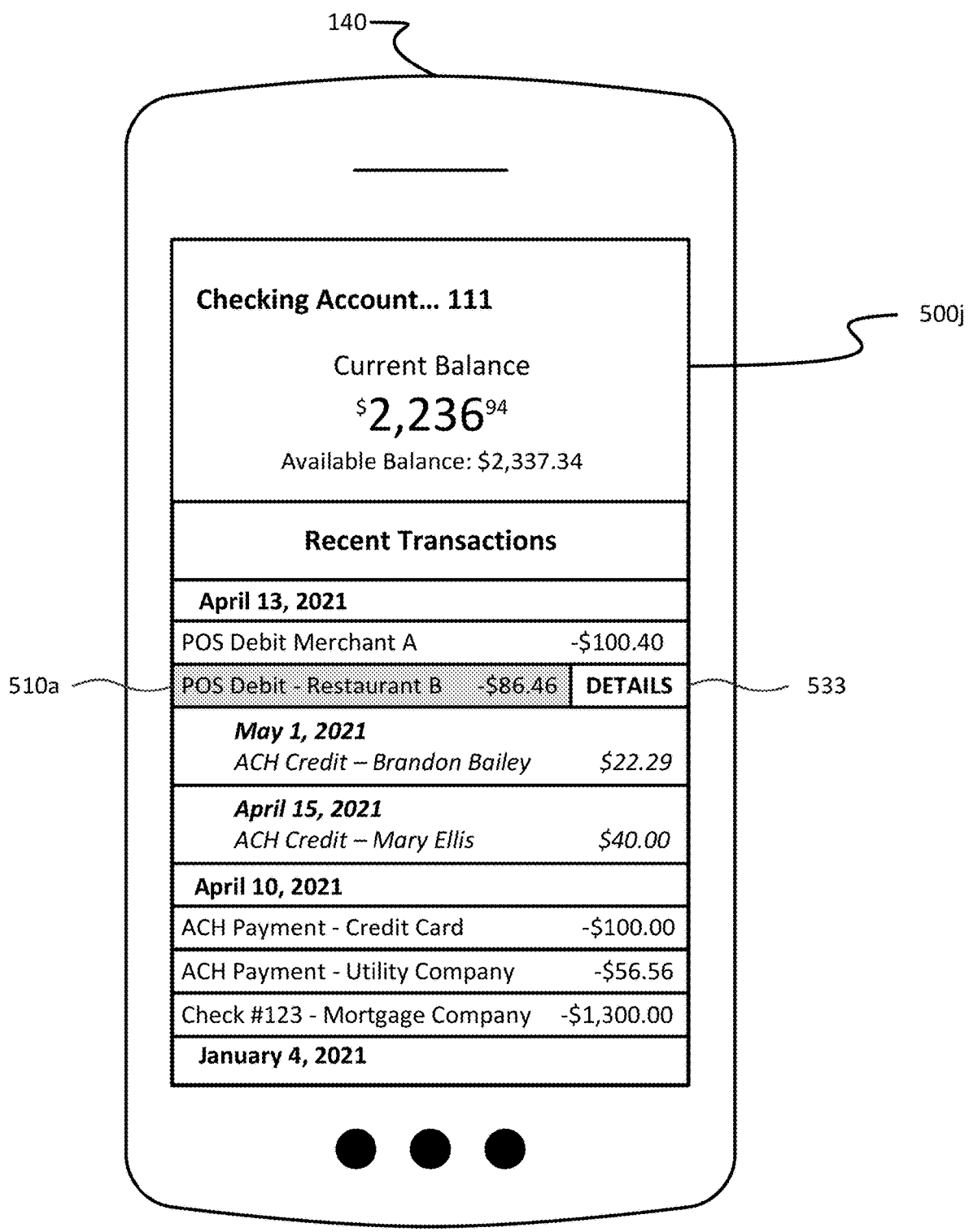

At step 460, the delegate computing device 150 may execute the application or website associated with the default or selected payment method, such as shown in FIG. 5H. The script may call one or more APIs for interfacing with the payment application or website. The script and/or the API may cause one or more fields associated with the payment application or website to be prepopulated with the payment information associated with the delegation request, such as a payment amount and recipient information identifying where payment should be made. The recipient information need not be sensitive financial information, such as a bank account or credit card number of the user, and instead may be information identifying the user who initiated the delegation request by an email address or a phone number associated with the user, which may later be used at a secure source device, such as the transaction server 110, to access the user's financial information. The delegate may adjust the prepopulated fields as needed. For instance the delegate may adjust the payment amount to enter a different amount.

At step 462, the script and/or API executing at the delegate device 150 may additionally determine whether to adjust the payment amount from the amount requested in the delegation request to a different amount. Such an adjustment may be necessary if delegation requests for a selected transaction were sent to more than one delegate and one or more of the delegates made a payment exceeding their respective requested amount, thus causing the remaining amount, of the total requested, needing to be paid by a final delegate to be less than the amount the requesting user originally requested. For instance, referring to FIGS. 5E-5G, assume Bob's portion of the $86.46 restaurant bill was $24.17, Brandon's portion was $24.82, and Mary's portion was $37.47. If Bob sent delegation requests to both Brandon and Mary for their respective amounts, and Mary was the first to submit payment, and she decided to contribute more to the bill than requested by Bob, then the amount Brandon needs to pay may be adjusted downward to account for the extra amount Mary contributed. For example, if Mary submitted a payment for $40.00 instead of $37.47, the difference between her actual payment amount and the requested amount, i.e., $2.53, may be subtracted from the amount Brandon needs to pay—thus adjusting his amount from the requested amount of $24.82 to adjusted amount of $22.29. The script and/or API may cause this adjustment to be made when Brandon attempts to make his payment. For instance, prior to the delegate's submission of payment, the script and/or API may query the payment delegation server 120 to determine if the requested payment amount for the delegate exceeds an outstanding or remaining amount to be paid toward the delegated transaction. If the requested payment amount exceeds the remaining amount to be paid toward the delegated transaction, the delegate's payment amount may be adjusted, such as shown in FIG. 5H.

At step 464, the script and/or API executing at the delegate computing device 150 may additionally cause a payment transaction generated by the delegate's payment method to be embedded with the payment token that was included in the payment URL. The script and/or API may cause the payment token to be embedded or stored in a field of the payment transaction record prior to the delegate submitting the payment transaction. Alternatively, the script and/or API may cause the payment token to be embedded in the payment transaction record upon receiving an indication that the delegate has submitted the payment transaction. The payment transaction record may comprise a number of fields and structure in accordance with a standard format used by the payment processing system 160. For instance, for an ACH network payment processing system, the payment transaction record may comprise a structure and layout consistent with the National Automated Clearing House Association (NACHA) standard ACH entry detail and/or entry detail addenda records. The script and/or API may cause the payment token to be stored in one of the standard fields of the transaction record—such as a memo, discretionary, miscellaneous, or other unused field of the payment transaction record. For instance, if the delegate chooses to make an ACH payment to the user, the payment token may be embedded in one of the standard unused fields of the ACH entry detail or entry detail addenda transaction records. For instance, as shown in FIG. 6A, the payment token may be stored in discretionary data field 610 of the payment transaction record. In some instances, where the discretionary data field 610 is being used for some other purpose, such as a memo field that has text included from the delegate, the payment token may be stored in a miscellaneous or other field, such as miscellaneous information field 620, of an addendum record associated with the transaction, such as shown in FIG. 6B. When the payment transaction is transmitted to the payment processing system 160 and eventually arrives at the user's bank, the payment token may be detected in the payment transaction record and may be used to link the delegate payment back to the original transaction.

Figure 4F:
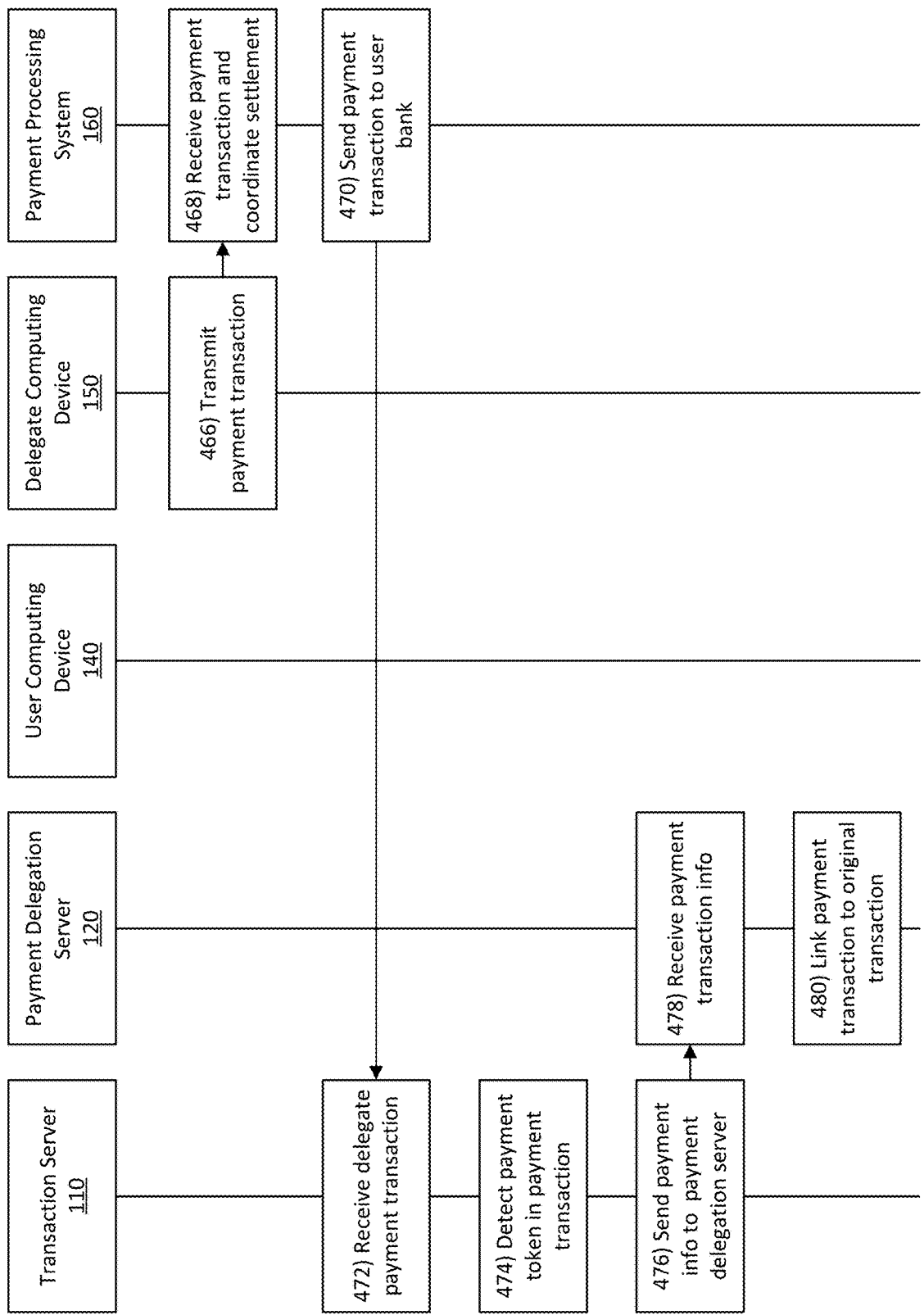

Referring to FIG. 4F, at step 466, upon receiving an indication at the delegate computing device 150 that the delegate has submitted payment, the delegate computing device 150 may transmit the payment transaction record to the payment processing system 160.

At step 468, the payment processing system 160 may receive the payment transaction record associated with the payment made by the delegate to the requesting user. The payment processing system 160 may coordinate a settlement process between a bank associated with the delegate and a bank associated with the requesting user.

At step 470, the payment processing system 160 may coordinate sending payment transaction record associated with the delegate's payment transaction to the requesting user's bank so funds for payment may be debited from the delegate's selected payment account and transmitted to the bank associated with the requesting user.

For instance, at step 472, the transaction server 110 may ultimately receive the payment transaction record associated with the delegate's payment and may credit the requesting user's payment account with the payment amount. The received payment transaction record may be embedded with the payment token stored therein at step 464.

In receiving and crediting the requesting user's payment account, at step 474, the transaction server 110 may detect the payment token in the payment transaction record. Detection of the payment token in the payment transaction record may serve as an indication that the payment transaction is a payment associated with a delegation request made by the user. The transaction server 110 may distinguish the payment token from other miscellaneous text that might otherwise be included in the payment transaction record (such as when the payment token is embedded in a memo field) based on an expected format of the payment token or based on successfully decoding the suspected payment token.

At step 476, the transaction server 110 may send, to the payment delegation server 120, payment information associated with the received payment transaction record and, at step 478, the payment delegation server 120 may receive the payment information. The payment information may include information such as a transaction identifier, a delegate name, contact information, or other identifier, a payment amount, a date received, a date posted, any note included in the transaction from the delegate, and the payment token that was embedded in the payment transaction record.

Upon receiving the payment transaction information, at step 480, the payment delegation server 120 may use the payment token to link the payment transaction with the original delegated transaction. For instance, the payment delegation server 120 may query the database 130, using the payment token, to identify the original delegated transaction having the same payment token stored therewith. The payment delegation server 120 may store, in association with the original transaction, the transaction identifier identifying the received payment transaction so that the payment transaction received from the delegate may be linked with the original transaction for which the user requested/delegated payment. The payment delegation server 120 may additionally update the corresponding stored delegation request to indicate that payment has been received from the delegate.

Referring to FIG. 4G, at step 482, after identifying the original transaction and linking the received payment transaction from the delegate to the original transaction, the payment delegation server 120 may cause a notification to be sent to the user notifying that a payment associated with a delegation request has been received. For instance, the payment delegation server 120 may send an email or a text message to the user, or may output a notification at the user computing device 140, via the banking application 111, notifying of receipt of a payment from the delegate.

At step 484, the user may receive the notification at the user computing device 140. For instance, the user may receive the notification via a user interface, such as user interface 500i shown in FIG. 5I, output at the banking application 111 executing on the user computing device 140. The notification may include a link, such as link 531, to the original transaction. Additionally or alternatively, the user may access the original transaction through a transaction viewing user interface of the banking application 111, such user interface 500a shown in FIG. 5A.

At step 486, the user computing device 140 may receive a request to view the original transaction and, at step 488, the user computing device 140 may cause the banking application 111 to output a user interface displaying a transaction summary comprising the original transaction with any received delegate payment transactions attached thereto. For instance, the user computing device 140 may cause the banking application 111 to output a user interface such as user interface 500j shown in FIG. 5J. The user interface may display the received payment transactions underneath the original transaction, for example, to indicate that the received payment transactions are associated with the original transaction. In some instances, the user may be able to select to original transaction and an option to view associated received delegated payments, and a list of delegated payments may be displayed. In some instances, the user may be able to select the transaction and also view pending delegate requests, e.g., those for which delegates have not yet sent payment. The user may be able to modify pending delegate requests to remove requests, adjust amounts, add additional delegates, or the like. In accordance with aspects of this disclosure, a user is able to efficiently and conveniently track, view, and manage received and/or pending payments associated with requests to split or delegate portions of a payment for a transaction.

In some instances, rather than the user generating and sending delegation requests to one or more individuals, the one or more individuals may instead proactively push payments to the user. For example, as described above with respect to steps 416-426, the user may scan a receipt, such as a bill from a restaurant, including a bar code or QR code, and the bar/QR code may be used to retrieve line item information associated with the transaction on the receipt. For instance, descriptions, prices, quantities, etc. of the various items purchased at the restaurant may be retrieved. The bar code or QR code may have embedded therein a link which calls a script to retrieve or request the line item details from a merchant device, and the corresponding line item details may be received and stored together in the database 130 with the original transaction to enhance the transaction. The enhanced transaction may further be used to generate a digital receipt, as described at step 428. In some cases, the payment token discussed above, which uniquely identifies an original transaction for linking with subsequent payment transactions, may be generated when the line item information is received and stored with the original transaction, rather then when the user submits the delegation request as discussed above. In the case where the payment token is generated upon receiving the line item information, the payment token may be embedded in the original transaction in a memo or other unused field of the original transaction in the same manner as described above. After the user has scanned the bar/QR code from the receipt and the original transaction is enhanced with the line item information, other individuals who may be co-located with the user and who also have installed on their devices, or have access to, the banking application 111 may also scan the bar/QR code from the same receipt. For instance, the user's friends with whom he shared a meal at the restaurant may scan the receipt after the user has scanned the receipt and paid for the transaction, so that each of the friends can send a payment to the user for their own portion of the meal. When the other individuals scan the bar/QR code, via the banking application 111, the script associated with the bar/QR code may, prior to requesting any line item information from a merchant device, first cause the database 130 to be queried to determine whether the line item information has already been retrieved and stored with an original transaction. The script may query the database 130 using identification information embedded in the bar/QR code—such as a unique transaction identifier, merchant name, merchant location, date/time of transaction, transaction amount, payment method, etc. or a combination thereof, to identify the original transaction and determine if it has already been enhanced with the line item information. If the script identifies the original transaction and determines that the line item information has already been retrieved and associated with the original transaction in the database 130, the script may retrieve and transmit to the individual's device the payment token that was generated when the line item information was originally received and stored, and information identifying the payor associated with the original transaction.

The script may also use the enhanced transaction to generate a digital receipt for display at the individual's device. Alternatively or additionally, instead of the individually scanning the receipt, the user who made the payment may transmit the generated digital receipt to the other individuals. For instance, the user may email or text the digital receipt to the individual, or may transmit the receipt from the user's device to the individual's device via a short-range communication protocol, such as Bluetooth, near-field communication (NFC), or the like. In some cases, the payment token may alternatively be generated and stored in the original transaction when the user transmits the generated digital receipt to another individual.

Upon receiving the digital receipt and the payment token at the individual's device, the digital receipt may be displayed in a user interface of the banking application 111, and the individual may select individual items from the digital receipt for which the individual would like to make payment. The script may further cause a default payment application to execute at the individual's device and may initiate payment for the selected items to the paying user, using the retrieved information identifying the payor associated with the original transaction. The script may further cause a payment transaction record generated by the individual's payment method to be embedded with the payment token and payment may be made to the user in the manner described with respect to steps 460 to 488.

While the above descriptions of FIGS. 4A-4G, 5A-5J, and 6A-6B describe the banking application 111 as being accessed and executed at the using computing device 140 to perform the various payment delegation and linking functions, alternatively or additionally, the banking application 111 may be accessed and executed via the transaction server 110, such as when a user accesses the banking application via a website associated with the transaction server 110, and the transaction server 110 may perform some or all of the various functions described above as being performed by the user computing device 140.

One or more aspects disclosed herein may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language, such as (but not limited to) HTML or XML. The computer-executable instructions may be stored on a computer-readable medium, such as a hard disk, optical disk, removable storage media, solid-state memory, RAM, or the like. As will be appreciated by one of skill in the art, the functionality of the program modules may be combined or distributed as desired in various embodiments. In addition, the functionality may be embodied in whole, or in part, in firmware or hardware equivalents such as integrated circuits, field programmable gate arrays (FPGA), or the like. Particular data structures may be used to more effectively implement one or more aspects disclosed herein, and such data structures are contemplated within the scope of computer-executable instructions and computer-usable data described herein. Various aspects disclosed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    obtaining, by a first computing device associated with a first user, first transaction data indicating a first transaction associated with the first user, wherein the first transaction data comprises a transaction identifier and a value of the first transaction;
    scanning, by the first computing device, image data of a receipt associated with the first transaction;
    converting, by the first computing device, the image data of the receipt to text information by performing a character recognition process on the image data;
    extracting, from the text information, line item information associated with the first transaction;
    obtaining contact information for sending a request to a second user for a portion of the value of the first transaction with the line item information;
    sending, to a payment delegation server, the transaction identifier and information indicating the portion of the value of the first transaction;
    receiving, from the payment delegation server, a payment uniform resource locator (URL) comprising:
        a first parameter indicating the portion of the value of the first transaction, and
        a second parameter indicating a payment token associated with the first transaction;
    generating a delegation request associated with the first transaction and comprising the payment URL;
    transmitting, to a second computing device associated with the second user and using the contact information, the delegation request comprising the payment URL, wherein the payment URL is configured to cause the second computing device to cause a payment application to embed the payment token in an encrypted format, indicated in the second parameter of the payment URL, in a second transaction associated with payment, by the second user, of the portion of the value of the first transaction;
    obtaining, from a payment processing system, second transaction data indicating the second transaction associated with the payment, by the second user, of the portion of the value of the first transaction;
    detecting the payment token in the encrypted format in a standardized field of the second transaction data;
    decoding the payment token to extract the first transaction data associated with the first transaction;
    linking, based on the extracted first transaction data, the second transaction to the first transaction;
    generating, based on the linking, an indication of a response to the delegation request associated with the first transaction; and
    generating, based on the indication of the response to the delegation request associated with the first transaction, a transaction summary comprising the first transaction associated with the first user and the second transaction associated with the payment, by the second user, of the portion of the value of the first transaction.

2. The computer-implemented method of claim 1, wherein the payment processing system comprises an Automated Clearing House (ACH) system.

3. The computer-implemented method of claim 1, wherein the payment processing system comprises a credit card processing system.

4. The computer-implemented method of claim 1, further comprising obtaining the first transaction data by:
    processing the image data to identify the value of the first transaction by performing a character recognition process on the image data.

5. The computer-implemented method of claim 1, further comprising:
    processing the image data to identify a bar code; and
    decoding the bar code to obtain the value of the first transaction.

6. The computer-implemented method of claim 1, further comprising obtaining the contact information by:
    requesting permission to analyze a user account;
    obtaining the permission to analyze the user account; and
    querying, based on a contact indicated in the user account, a third-party service to obtain the contact information.

7. The computer-implemented method of claim 1, wherein:
    the payment token is encoded using a character encoding; and
    generating the indication of the response comprises decoding the payment token included in the second transaction data.

8. The computer-implemented method of claim 1, wherein generating the indication of the response to the delegation request associated with the first transaction comprises:
    transmitting, to the payment delegation server, the second transaction data; and
    obtaining, from the payment delegation server, an indication that the second transaction data is associated with the delegation request associated with the first transaction.

9. An apparatus, comprising:
    one or more processors; and
    memory storing instructions that, when executed by the one or more processors, cause the apparatus to:
        obtain first transaction data indicating a purchase transaction associated with a first user, wherein the first transaction data comprises a transaction identifier and a value of the purchase transaction;
        scanning image data of a receipt associated with the purchase transaction;
        converting the image data of the receipt to text information by performing a character recognition process on the image data;
        extracting, from the text information, line item information associated with the purchase transaction;

obtain contact information for sending a request to a second user for a portion of the value of the purchase transaction with the line item information;

send, to a payment delegation server, the transaction identifier and information indicating the portion of the value of the purchase transaction;

receive, from the payment delegation server, a payment uniform resource locator (URL) comprising:
  a first parameter indicating the portion of the value of the purchase transaction, and
  a second parameter indicating a payment token associated with the purchase transaction;

generate a delegation request associated with the purchase transaction and comprising the payment URL;

transmit, to a second computing device associated with the second user and using the contact information, the delegation request comprising the payment URL, wherein the payment URL is configured to cause the second computing device to cause a payment application to embed the payment token in an encrypted format, indicated in the second parameter of the payment URL, in a payment transaction associated with payment, by the second user, of the portion of the value of the first transaction; obtain, from a payment processing system, second transaction data indicating the payment transaction associated with the payment, by the second user, of the portion of the value of the first transaction;

detect the payment token in the encrypted format in a standardized field of the second transaction data;

decode the payment token to extract the first transaction data associated with the first transaction;

link, based on the extracted first transaction data, the payment transaction to the purchase transaction;

transmit, to the payment delegation server, the second transaction data indicating the payment transaction;

obtain, from the payment delegation server and based on the payment token, an indication that the payment transaction is associated with the delegation request associated with the purchase transaction; and generate, based on the indication that the payment transaction is associated with the delegation request associated with the purchase transaction, a transaction summary comprising the purchase transaction associated with the first user and the payment transaction associated with the payment, by the second user, of the portion of the value of the purchase transaction.

10. The apparatus of claim 9, wherein the payment processing system comprises an Automated Clearing House (ACH) system.

11. The apparatus of claim 9, wherein the payment processing system comprises a credit card processing system.

12. The apparatus of claim 9, wherein the instructions, when executed by the one or more processors, cause the apparatus to obtain the first transaction data by:
  processing the image data to identify the value of the purchase transaction by performing a character recognition process on the image data.

13. The apparatus of claim 9, wherein the instructions, when executed by the one or more processors, cause the apparatus to obtain the first transaction data by:
  processing the image data to identify a bar code; and
  decoding the bar code to obtain the first transaction data.

14. The apparatus of claim 9, wherein the instructions, when executed by the one or more processors, cause the apparatus to obtain the contact information by:
  requesting permission to analyze a user account;
  obtaining permission to analyze the user account; and
  querying, based on a contact indicated in the user account a third-party service to obtain the contact information indicated in the user account.

15. The apparatus of claim 9, wherein:
  the payment token is encoded using a character encoding; and
  the instructions, when executed by the one or more processors, further cause the apparatus to:
    transmit the second transaction data to the payment delegation server based on successfully decoding the payment token received in the second transaction data.

16. A non-transitory, computer-readable medium storing instructions that, when executed by one or more processors, cause the one or more processors to perform steps comprising:
  obtaining, by a first computing device associated with a first user, first transaction data indicating a purchase transaction associated with the first user, wherein the first transaction data comprises a transaction identifier and a value of the purchase transaction;
  scanning image data of a receipt associated with the purchase transaction;
  converting the image data of the receipt to text information by performing a character recognition process on the image data;
  extracting, from the text information, line item information associated with the purchase transaction;
  receiving a request to delegate a portion of the value of the purchase transaction;
  querying a computing device to obtain contact information for sending a request to a second user for the portion of the value of the purchase transaction comprising the line item information;
  sending, to a payment delegation server, the transaction identifier and information indicating the portion of the value of the purchase transaction;
  receiving, from the payment delegation server, a payment uniform resource locator (URL) comprising:
    a first parameter indicating the portion of the value of the purchase transaction, and
    a second parameter indicating a payment token associated with the purchase transaction;
  generating a delegation request associated with the purchase transaction and comprising the payment URL;
  transmitting, to a second computing device associated with the second user and using the contact information, the delegation request comprising the payment URL, wherein the payment URL is configured to cause the second computing device to cause a payment application to embed the payment token in an encrypted form, indicated in the second parameter of the payment URL, in a payment transaction associated with payment, by the second user, of the portion of the value of the purchase transaction;
  obtaining, from an Automated Clearing House (ACH) system, second transaction data indicating the payment transaction associated with the payment, by the second user, of the portion of the value of the purchase transaction;
  detecting the payment token in the encrypted format in a standardized field of the second transaction data;

decoding the payment token to extract the first transaction data associated with the purchase transaction;

linking, based on the extracted first transaction data, the payment transaction to the purchase transaction;

generating, based on the linking, an indication of receipt of a payment associated with the delegation request associated with the purchase transaction; and generating, based on the indication of receipt of the payment associated with the delegation request associated with the purchase transaction, a transaction summary comprising the purchase transaction associated with the first user and the payment transaction associated with the payment, by the second user, of the portion of the value of the purchase transaction.

17. The non-transitory, computer-readable medium of claim 16, wherein:

the payment token is encoded using a character encoding; and the instructions, when executed by the one or more processors, cause the one or more processors to generate the indication of receipt of the payment associated with the delegation request associated with the purchase transaction based on successfully decoding the payment token.

18. The non-transitory, computer-readable medium of claim 16, wherein the instructions, when executed by the one or more processors, cause the one or more processors to generate the indication of receipt of the payment associated with the delegation request associated the purchase transaction by performing steps comprising:

transmitting, to the payment delegation server, the payment token; and obtaining, from the payment delegation server, an indication that the payment token is associated with the purchase transaction.

19. The non-transitory, computer-readable medium of claim 16, wherein the instructions, when executed by the one or more processors, cause the one or more processors to obtain the first transaction data by performing steps comprising:

processing the image data to identify the value of the purchase transaction by performing a character recognition process on the image data.

20. The non-transitory, computer-readable medium of claim 16, wherein the instructions, when executed by the one or more processors, cause the one or more processors to obtain the first transaction data by performing steps comprising:

processing the image data to identify a bar code; and decoding the bar code to obtain the first transaction data.

21. The computer-implemented method of claim 1, wherein the payment URL is further configured to cause the second computing device to:

output a user interface associated with the payment application;

populate, with the portion of the value of the first transaction indicated in the first parameter of the payment URL, a first field of the user interface for generating the second transaction; and cause the payment application to embed the payment token after an indication of user acceptance of the second transaction via the payment application and prior to submission of the second transaction to the payment processing system, wherein submission of the second transaction causes the second transaction to be transmitted to the payment processing system with the embedded payment token.

\* \* \* \* \*